(12) United States Patent
Karelic et al.

(10) Patent No.: US 6,674,855 B1
(45) Date of Patent: Jan. 6, 2004

(54) HIGH PERFORMANCE MULTIFREQUENCY SIGNAL DETECTION

(75) Inventors: Yair Karelic, Ramat Gan (IL); Tamar Shoham, Petach-Tikva (IL); Yosef Wexler, Nazereth Illit (IL)

(73) Assignee: Comverse Ltd., Tel Aviv (IL)

( * ) Notice: Subject to any disclaimer, the term of this patent is extended or adjusted under 35 U.S.C. 154(b) by 0 days.

(21) Appl. No.: 09/413,026

(22) Filed: Oct. 6, 1999

(51) Int. Cl.$^7$ .............................. H04M 1/00; H04M 3/00
(52) U.S. Cl. ....................................... 379/386; 379/283
(58) Field of Search .................................. 379/283, 286, 379/386, 387.01, 387.02

(56) References Cited

U.S. PATENT DOCUMENTS

| | | | |
|---|---|---|---|
| 4,853,958 A | 8/1989 | Rabipour et al. | 379/386 |
| 5,023,906 A | 6/1991 | Novas | 379/372 |
| 5,353,346 A * | 10/1994 | Cox et al. | 379/386 |
| 5,392,348 A | 2/1995 | Park et al. | 379/386 |
| 5,442,696 A | 8/1995 | Lindberg et al. | 379/386 |
| 5,477,465 A * | 12/1995 | Zheng | 702/76 |
| 5,588,053 A * | 12/1996 | Xie | 379/386 |
| 5,631,957 A | 5/1997 | Greiss et al. | 379/406 |
| 5,644,634 A | 7/1997 | Xie et al. | 379/386 |
| 5,694,466 A | 12/1997 | Xie et al. | 379/386 |
| 5,807,133 A * | 9/1998 | Arnett | 439/418 |
| 5,809,133 A | 9/1998 | Bartkowiak et al. | 379/386 |
| 5,818,296 A | 10/1998 | Lee et al. | 329/300 |
| 5,818,929 A | 10/1998 | Yaguchi | 379/418 |
| 6,608,896 B2 * | 8/2003 | Felder et al. | 379/386 |

FOREIGN PATENT DOCUMENTS

| | | |
|---|---|---|
| CA | 940206 | 1/1974 |
| CA | 1289281 | 9/1991 |
| CA | 2094412 | 5/1998 |
| WO | WO 97/39541 | 10/1997 |

OTHER PUBLICATIONS

P. Daponte et al., "Neural network and DSP based decoder for DTMF signals", IEE Proc.–Sci. Meas. Technol. vol. 147, No. 1, Jan. 2000.
Amey A. Deosthali et al., A Low–Complexity ITU–Compliant Tone Multiple Frequency Detector, IEEE Trans. on Signal Processing, vol. 48, No. 3, Mar. 2000.
Amey A. Deosthali et al., A Low–Complexity ITU–Compliant Dual Tone Multiple Frequency Detector, Draft dated Oct. 1999, available at http://www.ece.utexas.edu/~bevans/papers/2000/dtmf, updated Mar. 20, 2000.
54 abstracts of technical articles. Various dates, 34 pp.
"Numerix—Algorithms—The Algorithm", Numerix web page, http://www.compulink.co.uk/numerix/goertzel.html, 2 pp. (1999).

(List continued on next page.)

Primary Examiner—Binh Tieu

(57) ABSTRACT

A multifrequency detector, such as a DTMF detector, includes a Goertzel module detecting energies of a current frame of an incoming signal at nominal tone frequencies. A number of ratios are computed from the detected energies and supplied as an input to a multidimensional thresholding device such as a neural network. The neural network generates a decision level to be used in a subsequent frame decision. A frequency estimation module also receives the incoming signal and generates a number of frequency estimation indications to be used in the final determination of whether the incoming signal contains a valid multifrequency signal. A low-level decision module returns a frame decision result (D/N) for the current frame based on inputs from the Goertzel module and the decision level. A high-level decision module receives the frame decision result and information based on the frequency estimation indications. A state machine generates a digit start signal when the frame decision result and the frequency estimation information indicate a transition from an out-of-digit state to an in-digit state. The detector outputs a suggested digit provided by the Goertzel module and an affirmative digit detection result when the state machine transitions from out-of-digit to in-digit.

36 Claims, 12 Drawing Sheets

OTHER PUBLICATIONS

Baohua Zheng, "*Arbitrary Allocation of Center Frequencies in Signal Detectors Using The Goertzel Algorithm*", Proceedings of the Fourth International Conference on Signal Processing Applications and Technology, pp. 308–310, vol. 1, 1993.

Baohua Zheng, "*Some Simple Energy Based Test Criteria For Improving Talk–Off Immunity In DTMF Receivers*", Proceedings of the 5th International Conference on Signal Processing Applications and Technology, pp. 287–291, vol 1, 1994.

M. Kerbis, "DTMF–Talk–Off Immunity Without Real–time Consumption", Proceedings of the International conference on signal Processing and Technology, vol. 1, pp. 177–180, 1992.

S. Bagchi, S. K. Mitra, "Efficient robust DTMF decoding using the subband NDFT", Signal Processing v. 56 pp. 255–267, 1997.

B. Ha, S. Ann, "*On Implementing the Digital DTMF Receiver Using PARCOR Analysis Method*", J. Korea Inst. Electron Eng. (South Korea), vol 24, no 2, pp. 14–18, 1987.

J. Pawate, W. Steenaart, "*TMS 320 Based Touch–Tone Receiver Using Linear Prediction*", MONTECH '87 Conference on Communications (1987).

David L. Beard, "*DSP Implementation of a High Performance DTMF Detector*", ICSPAT–98, pp. 448–452, 1998.

Matthew D. Felder, James C. Mason, Brian L. Evans, "*Efficient Dual–Tone Multifrequency Detection Using the Nonuniform Discrete Fourier Transform*", IEEE Signal Processing Letters, vol. 5, No. 7, Jul. 1998.

Subramaniyan, A. Hiregange, S. Kalyanakrishnan, N. Srinivasa, "*DTMF Generation and Detection on the Motorola DSP56100 Family*", Proceedings of the 5th International Conference on Signal Processing Applications and Technology, pp. 292–297, vol. 1, 1994.

L. Gay, J. Hartung, G. L. Smith, "*Algorithms For Multi–Channel DTMF Detection For The WE DSP32 Family*", IEEE 1989.

Bagchi, S. K. Mitra, "*An Efficient Algorithm For DTMF Decoding Using The Subband NDFT*", 1995 IEEE Symposium on Circuits and Systems (Cat. No. 95CH35771), pp. 1936–1939, vol. 3, 1995.

G. Kyeong, J. I. Baek, H. H. Lee, "*A Study on the Feasibility of Parcor–Type Receiver in DTMF Signaling*", IEEE TENCON '87 (1987).

Benjamin Kedem, "*Spectral Analysis and Discrimination by Zero–Crossings,*" Processings of the IEEE, vol. 74, No. 11, Nov. 1986, pp. 1477–1493.

Kazuyuki Hara and Kenji Nakayama, "*Signal Classification Based on Frequency Analysis Using Multilayer Neural Network with Limited Data and Computation,*" 1995 IEEE International Conference on Neural Networks Proceedings v. 1, pp. 600–605 (1995).

Ali M. Shatnawi, Ahmad I. Abu–El–Haija & Abid M. Elabdalla, "*A Digital Receiver for Dual Tone Multifrequency (DTMF) Signals,*" IEEE Instrumentation and Measurement Technology Conference: Sensing, Processing, Networking. IMTC Proceedings vol. 2, pp. 997–1002 (1997).

S. L. Marple, Digital Spectral Analysis With Applications ch. 13, pp. 361–378.

B. Porat, Digital Processing of Random Signals ch. 9, pp. 260–293.

Richard Roy and Thomas Kailath, "*ESPRIT—Estimation of Signal Parameters Via Rotational Invariance Techniques,*" IEEE Transactions on Acoustics, Speech, and Signal Processing, vol. 37, No. 7, Jul. 1989, pp. 984–995.

J. N. Denenberg, "*Spectral Moment Estimators: A New Approach to Tone Detection,*" The Bell System Technical Journal, American Telephone and Telegraph Company, vol. 55, No. 2, Feb. 1976, pp. 143–155.

Petre Stoica and Torsten Söderstrom, "*Statistical Analysis of MUSIC and Subspace Rotation Estimates of Sinusoidal Frequencies,*" IEEE Transactions on Signal Processing, vol. 39, No. 8, Aug. 1991, pp. 1836–1847.

Emin Anarim and Bülent Sankur, "*Robust detection of tone signals by autoregressive frequency estimation,*" Signal Processing vol. 30 (1991), pp. 271–277.

Bijit Halder and Thomas Kailath, "*Efficient Estimation of Closely Spaced Sinusoidal Frequencies Using Subspace–Based Methods,*" IEEE Signal Processing Letters, vol. 4, No. 2, Feb. 1997, pp. 49–51.

S. Haykin, Adaptive Filter Theory ch. 12 (2d ed.), pp. 536–561.

* cited by examiner

HIGH PERFORMANCE MULTIFREQUENCY SIGNAL DETECTION

BACKGROUND OF THE INVENTION

1. Field of the Invention

The present invention relates to detection of multifrequency (MF) communication signals such as dual-tone multifrequency (DTMF) signals.

2. Description of the Related Art

Multifrequency (MF) signaling allows control and data signals to be transmitted over conventional communication channels that may be used concurrently to carry other information, such as voice and data. A MF signal comprises two or more simultaneous (and relatively pure) tones that together represent a digit, character, or other information according to an agreed format. The communication channel can be provided by land lines (wire, cable, fiber optic, etc.), wireless signaling such as microwave and satellite links, and so forth.

Telephone networks use Dual-Tone Multi-Frequency (DTMF) signaling to transmit dialed digits between telephone sets and a central office or switch. Typically DTMF techniques are also used for voice-mail user interfaces, Interactive Voice Response (IVR) systems, and similar interactive control systems. DTMF signaling is a particular case of MF signaling that will be discussed herein in detail. However, the same issues of concern for DTMF signaling also arise in MF signaling generally.

A DTMF signal is a combination of two tones having well-defined frequencies typically selected from a standard pair of disjoint frequency band. For example, the current ITU-T standard (set forth in the ITU-T Q.24 recommendation) establishes a high band tone set of four tones with nominal frequencies at 1209, 1336, 1477, and 1633 hertz (Hz), respectively. The low band consists of four tones with nominal frequencies at 697, 770, 852, and 941 Hz. Of course, alternate MF standards could use different nominal frequencies and could use more or fewer tones in either or both bands.

A MF signal is detected using a MF detector. Such a product must be highly reliable to ensure proper detection of information represented in a valid MF signal while rejecting detection of non-MF signals that may also be received on the communication channel. A MF detector, such as a DTMF detector, must be able to determine (reliably) that a true MF signal (such as a dialed "7") has been received. Determination of whether a received signal is an MF signal will be "digit detection." The detector must also be able to identify (reliably) the tone components representing the dialed digit, character, or other information.

High quality MF detectors must be designed for robustness in conditions of substantial signal impairments. Good signal detection performance means the MF detector must be capable of reliable digit detection in the presence of voice, non-MF data, random noise, and so forth (collectively "noise"). This entails a requirement that the detector have both high sensitivity and high selectivity. "Sensitivity" refers to the degree of assurance that the detector will correctly detect a DTMF signal when such a signal is received. "Selectivity" refers to the degree of assurance that the detector will reject a received signal when the signal is actually not a valid MF signal.

High selectivity is reflected in a low "talk-off" rate, which is defined as a low rate at which non-MF signals are incorrectly identified as valid MF signals. Talk-offs typically arise from noise (such as voice signals, non-MF data signals, random noise, etc.). High sensitivity is reflected in a low "talk-down" rate, i.e., a low rate at which valid MF signals are incorrectly classified as non-MF signals. Talk-downs may occur when true MF signals are transmitted, but one or more of their constituent tones are shifted in frequency from their nominal frequencies. A talk-down also can occur when a constituent tone in a valid MF is misshapen by the communication link and therefore contains frequency constituents other than the nominal frequency for that tone. A high quality detector must have both a low talk-off rate and a low talk-down rate.

Noise and distortion can also degrade the detector's ability to identify correctly the digit, character, or other information represented by a valid MF signal. For example, a high quality DTMF detector must be able to identify correctly the two nominal tones of a DTMF signal. The tone identification must be highly reliable, even when the tones are subjected to frequency offsets and are superimposed with noise.

Most commercial DTMF detectors perform spectral computations, particularly based on modified Goertzel (MG) algorithms, to analyze incoming signals. A spectral decomposition of the signal is thereby generated, with a calculated energy for each of several nominal frequencies. Such detectors differ mainly in the way the results of the energy calculations are used for signal detection, i.e., to distinguish between true DTMF signals and other signals or noise.

A typical Goertzel-based detector will have a digital filter providing, for example, eight passbands centered at the eight nominal frequencies of the conventional DTMF standard. This basic structure constrains the computational and signal accumulation requirements of the detector within reasonable limits. On the other hand, such detectors are prone to false detections (talk-offs) when a non-DTMF signal has high and low band energy peaks close to center frequencies for the filter. Most MG filters therefore are unable to reject a signal (i.e., correctly detect the signal as a non-DTMF signal) if the signal has energy peaks within 3% of nominal DTMF frequencies.

To avoid this trade-off between accumulation time and frequency resolution, it has been proposed to estimate the frequencies of the incoming signal directly. See David L. Beard, *DSP Implementation of a High Performance DTMF Decoder*, ICSPAT-98 Proceedings 448–452 (1998). A frequency estimator was constructed by opening the feedback path of a Goertzel filter, thereby adapting the structure to measure a frequency, instead of measuring energy at a specified frequency.

This frequency estimation approach was able to satisfy some performance standards by including a running statistical analysis to determine a mean and standard deviation of the frequency estimates. Separate statistics thresholds were used for digit detection and in-digit stability. Further, effective performance involved selection of thresholds and parameters specific to a desired performance standard. With careful tailoring of the statistics thresholds, this detector had good talk-off performance in the presence of frequency offsets.

Detectors based on MG filters are also prone to false rejections (talk downs) when the signal "twist" is too high. "Twist" is defined as the ratio of highest energy in the high band to the highest energy in the low band (expressed in dB). In a typical case, such a MF detector may be configured to reject signals having twist less than −4 dB or greater than 4 dB. If the communication channel induces significant frequency-dependent attenuation, then the detector will have a high rate of false rejections.

U.S. Pat. No. 5,442,696, issued Aug. 15, 1995, to Lindberg et al., describes an alternative to Goertzel algorithm filters in a DTMF detector. An incoming signal is sliced into successive frames, and each frame is duplicated in several copies. For each frame, the copies of the frame are shaped with different shaping sequences ("tapers") such as discrete prolate spheroidal sequences.

The detector then Fourier-transforms the shaped copies and, like the MG-based detectors, combines the results to form an estimate of the signal's spectral distribution of energy. An inner product is then formed between the spectral estimate and each of several model energy distributions, and the inner product is compared with a threshold. Signal detection is then performed based on the inner products, if any, that pass the threshold test. Like MG filtering, therefore, this approach evaluates an incoming signal against discrete nominal frequencies and requires substantial computation and data accumulation for each frequency.

Canadian Patent No. 2,094,412 discloses a detector using an adjustable notch filter in each of the high and low bands. A frequency estimator identifies a frequency for a dominant spectral tone in each band. The frequency is then used to configure the corresponding notch filter, which in turn filters out the corresponding dominant component. This enables the system to measure the monotonicity of the received signal in each of the two bands by comparing the output of each notch filter to its corresponding input.

This monotonicity approach thus provides an alternative to spectral analysis and apparently avoids the heavy computational requirements of DFT-type systems while substantially reducing talk-off. Because it avoids generating an energy distribution, however, this system must rely on a relatively coarse measure of twist. Moreover, the effectiveness of the notch filters to detect monotonicity depends on frequency estimates with low variance. The Canadian reference addresses this constraint by requiring longer data accumulation blocks and by performing multiple measurements of each frequency.

The existing MF detectors of various types have therefore provided some improvement in suppressing false detections (talk-off), but have not addressed the parallel problem of false rejection. Further, the existing detectors also tend to rely on careful selection of computational procedures and parameters to produce good results. This prevents such detectors from being reliably optimized for the particular signal environment of a customer installation.

Hence, an unmet need has existed for a MF detector with both sensitivity (low rate of false rejections) and selectivity (low rate of false detections). Such a system should accept genuine MF signals, despite high twist values between different frequency bands. A further desirable feature would be rejection of signals with excessive frequency deviation, without applying inflexible upper bounds on deviation that could reduce sensitivity of the detector. Ideally, such a detector could be configured using customer-specific data in a reliable, repeatable procedure to provide performance optimized for the signal environment of a specific customer installation.

SUMMARY OF THE INVENTION

It is an object of the present invention to provide a multifrequency detector with improved talk-off performance in conjunction with improved talk-down performance.

The present invention provides a multifrequency detector and a corresponding method and corresponding computer software. The multifrequency detector comprises a frequency estimation module and a decision module. The frequency estimation module calculates a plurality of estimated frequencies for an input signal and quality information corresponding to the estimated frequencies. The input signal is based on a frame of a signal. The decision module performs digit detection based on the quality information and frame decision result for the frame.

In a second aspect, the invention provides a multifrequency detector comprising an energy analysis module and a decision unit, as well as a corresponding method and corresponding computer software. The energy analysis module generates a plurality of indices based on a plurality of spectral coefficients for a frame of a signal. The decision unit generates a decision level based on a combination of the indices and outputs the decision level for comparison with a predetermined threshold value.

In a third aspect, the invention provides a multifrequency detector comprising a decision logic and a neural network, as well as a corresponding method and corresponding computer software. The decision logic generates a plurality of indices from a plurality of spectral coefficients for an input signal representing a frame of a signal. The neural network comprises an input layer, a hidden layer, and an output layer. The input layer generates plural first signals based on the indices. The hidden layer generates plural second signals based on the first signals. The output layer generates a decision level based on the second signals, for comparison with a predetermined threshold value.

In a fourth aspect, the invention provides a method for training an adaptive multifrequency detector comprising a neural network. The method comprises two training operations. In a training operation the neural network is trained using back-propagation with input vectors from a heuristic signals database. In another training operation the neural network is trained using back-propagation with input vectors from an updated signals database generated from the heuristic signals database in accordance with a performance measurement for the neural network trained using the heuristic signals database.

Additional objects and advantages of the invention will be set forth in part in the following description and, in part, will be obvious therefrom or may be learned by practice of the invention.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1A:
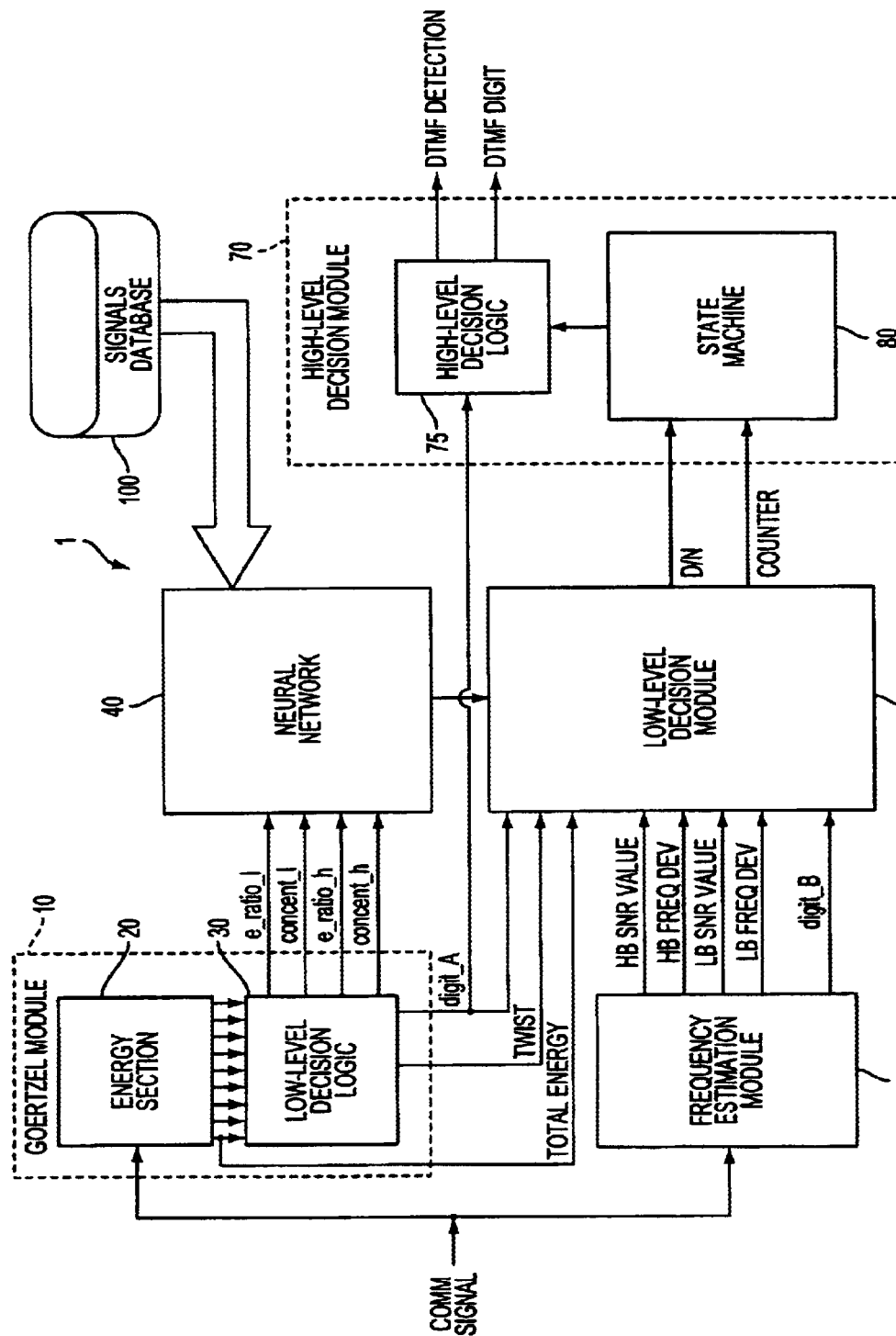
FIG. 1A is a block diagram of a DTMF detector constructed according to the principles of the present invention.

Reference will now be made in detail to the presently preferred embodiments of the invention, examples of which are illustrated in the accompanying drawings, wherein like reference numerals refer to like elements throughout.

FIG. 1A shows an embodiment of the present invention implemented as a DTMF detector 1. According to one aspect of the invention, detector 1 can be implemented as a software process running on a programmable digital computer. Alternatively, a detector according to the present invention can be realized as part of a dedicated integrated circuit in a hardware implementation.

Figure 1B:
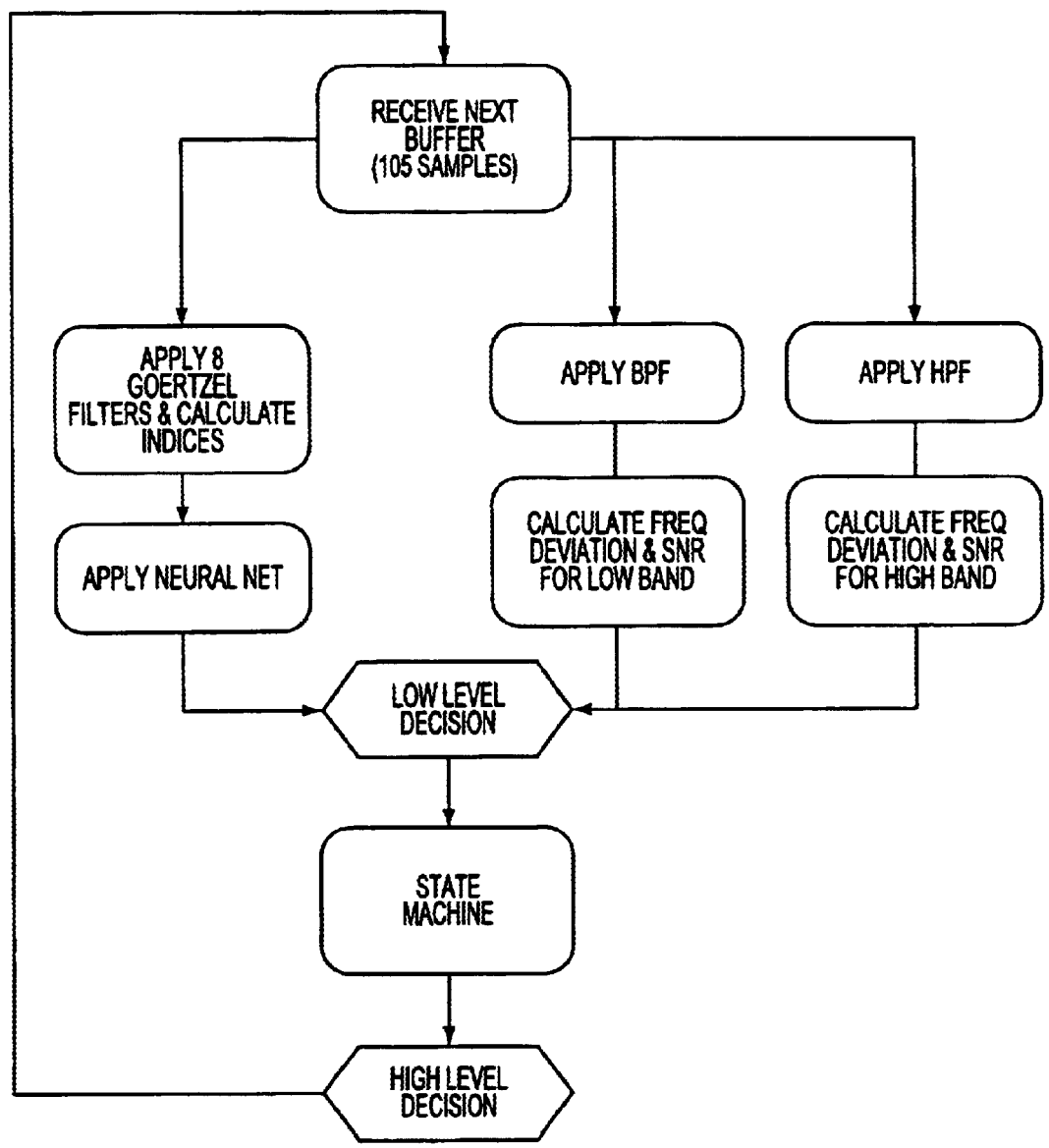
FIG. 1B is an operational flow diagram of the detector shown in FIG. 1A.

An overview of the operation of detector 1 is illustrated in FIG. 1B. Detector 1 accepts as its input a stream of digitally sampled signal frames and outputs a stream of detected digits. Here a "frame" is a predetermined number of consecutive digital samples of the incoming signal, such as 105 consecutive samples.

As explained below, detector 1 uses certain determinations regarding the validity of the current frame and one or more preceding frames, as well as "quality information" regarding the frequencies represented in the current frame, to determine whether to detect a DTMF digit in the incoming signal. First, a determination is performed regarding whether the current frame is to be considered a "DTMF frame" for purposes of digit detection. Here a "DTMF frame" is a frame that is provisionally considered to represent a DTMF digit because the frame may be part of a valid DTMF signal. This determination will be called a "frame decision." For purposes of the present discussion, a frame for which the frame decision result is positive will be labeled "D" (for "digit"), and a frame for which the frame decision result is negative will be labeled "N" (for "non-digit").

As shown in FIGS. 1A–1B, an energy analysis module such as Goertzel module 10 receives an incoming communications signal for detection, applies a bank of filters and performs several calculations using the outputs of the filters. Preferably, the filters are digital filters. In a particularly preferred embodiment, such digital filters are Goertzel filters. Alternatively, such as in a hardware implementation of detector 1, the filters of the energy analysis module may be analog filters.

The results of these operations provide several spectral coefficients for the received signal and a number of indices and energy values generated from the spectral coefficients. Here a "spectral coefficient" is a value indicating the energy (in relative or absolute terms) of the received signal at a corresponding frequency. The several spectral coefficients together comprise a "spectral distribution" of the signal energy.

Module 10 comprises an energy section 20 and low-level decision logic 30, to be described in more detail with reference to FIG. 2. In particular, low-level decision logic outputs several energy ratios including a "twist" value, as well as a "suggested digit" for the current frame, digit_A.

A neural network 40 is then applied to some of the outputs of low-level decision logic 30. A decision level ranging from −1.0 to +1.0 is generated by neural network 40, as described in greater detail below with reference to FIGS. 3 and 4.

In parallel with the operation of Goertzel module 10, a frequency estimation module 50 receives the incoming signal frames and outputs high-band and low-band estimation results. Frequency estimation module 50 estimates the high-band and low-band dominant frequencies and generates quality information for each band. Here, "quality information" means information indicating the quality of the signal, or the accuracy of the dominant frequencies relative to standard MF frequencies, or both. Signal "quality" means the strength of the information-bearing components of the signal relative to random components thereof, and is typically expressed as a signal-to-noise ratio measured in decibels. In a preferred embodiment, frequency estimation module may generate for each band a frequency estimate, a frequency deviation estimate, and a value indicating a signal-to-noise ratio (SNR) for the band, as well as an estimated digit (digit_B) for the DTMF signal. Module 50 will be described in detail with reference to FIG. 5.

A low level decision module 60 receives the decision level from neural network 40, the quality information and the estimated digit from frequency estimation module 50, and the twist and total energy values from Goertzel module 10. Based on these inputs, module 60 performs a frame decision for the current frame and generates an appropriate frame decision result ("D" or "N"). Module 60 will be described in detail below with reference to FIGS. 6A and 6B.

Module 60 outputs the frame decision result and a value COUNTER to a high level decision module 70, which is responsible for the final decision of whether a DTMF signal exists in the incoming signal. Module 70 comprises a high-level decision logic 75 and a state machine 80. State machine 80 processes the frame decision result and the COUNTER value to determine whether the current state of the received signal is a DTMF digit. The state transition structure of a first embodiment of state machine 80 is illustrated in FIG. 8A, and a further preferred embodiment is illustrated in FIG. 8B. The state of state machine 80 after processing these inputs is output to high-level decision logic 75. As explained below with reference to FIG. 2, low-level decision logic 30 outputs a suggested digit value digit_A to high-level decision logic 75. As described below with reference to FIG. 7, high-level decision logic 75 outputs a digit detection result indicating whether a DTMF digit is detected in the incoming signal. When the digit detection result is affirmative, the detected digit is also output.

The modules illustrated in FIG. 1A operate in a sequential manner, one after another, on each successive frame of signal samples. In a preferred implementation, each frame consists of 105 samples with an overlap of 20 samples between adjacent frames. The values of the frame length and overlap derive from a requirement for the minimum DTMF signal length the detector must accept and a requirement for the detection of DTMF signals having frequency deviations.

Goertzel Module

Figure 2:
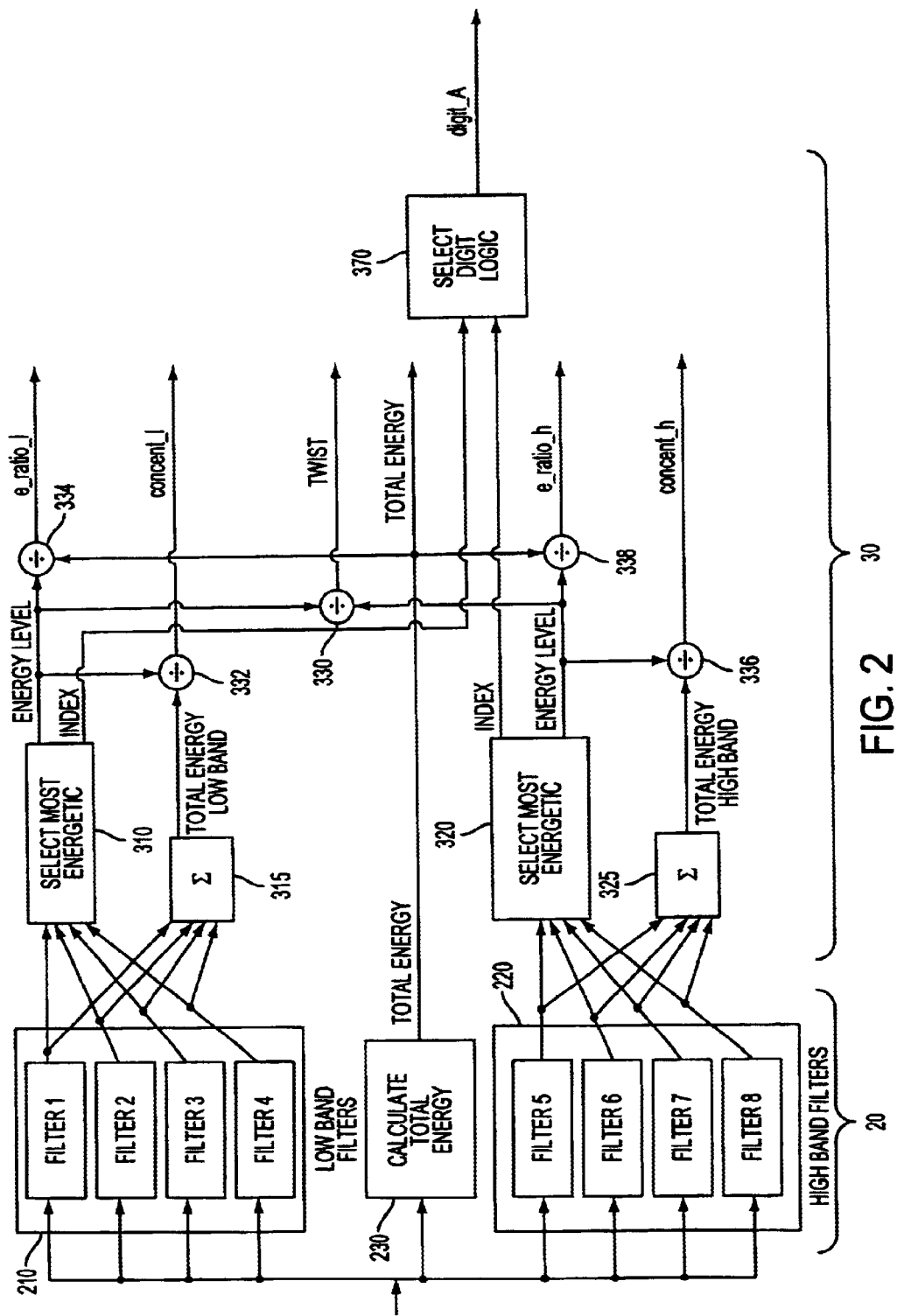
FIG. 2 is a detailed block diagram of the Goertzel module of FIG. 1A.

FIG. 2 is a detailed diagram of Goertzel module 10. Energy section 20 includes a bank of low-band filters 210 and a bank of high-band filters 220. Each of the filters 210 and 220 outputs a corresponding spectral coefficient for the current frame and may be a Goertzel filter, for example. Here a "Goertzel filter" is a digital filter implementing the Goertzel algorithm or any of various modifications thereof. In the presently preferred embodiment, filters 210 and 220 together provide eight filters based on a modified Goertzel algorithm, with each filter centered at one of the eight standard DTMF signal frequencies according to the ITU-T Q.24 recommendation. The Goertzel algorithm and various modifications thereof are well known to those of skill in the signal detection arts, and thus further description thereof will be omitted here.

Energy section 20 also includes a total energy block 230 that calculates the total energy of the current frame. The total energy value is output to low-level decision logic 30 and to low-level decision module 60. Those of skill in the art will readily appreciate that various implementations of energy section 20 can be made with routine effort. Accordingly, further detail of block 230 will be omitted here.

Low-level decision logic 30 receives the total energy value and the energies output by the eight filters 210, 220 at each frame. Low-band selection logic 310 identifies the most energetic filter in the low band (i.e., the "low-band winner") and outputs the associated energy level and a frequency identifier indicating the nominal frequency of the low-band winner. Adder 315 also receives the outputs of filters 210 and outputs the total energy of the low band. High-band selection logic 320 similarly identifies the most energetic filter in the high band (the "high-band winner") and outputs the associated energy and a frequency identifier for the high-band winner. Adder 325 outputs the total energy of the high band.

Importantly, logic 30 also computes several numbers, which will be called "indexes" (or "indices"), that will be used later in performing the current frame decision. These indices are obtained by calculating various ratios based on the spectral coefficients output by the high-band and low-band winners and other energy levels. In the presently preferred implementation, the following ratios were used:

e_ratio_l=low band winner energy/total energy e_ratio_h=high band winner energy/total energy concent_l=low band winner energy/low band energy concent_h=high band winner energy/high band energy twist=high band winner energy/low band winner energy.

FIG. 2 shows that these ratios are calculated in the usual manner by applying the outputs of selection logic 310, 320 and adders 315, 325 to division units 330 (twist), 332 (concent_l), 334 (e_ratio_l), 336 (concent_h), and 338 (e_ratio_h).

The frequency identifiers output from selection logic 310 and 320 are also applied to digit selection logic 370. Because filters 210, 220 are centered on the eight standard DTMF frequencies, these frequency identifiers together correspond to a DTMF digit. Logic 370 outputs the corresponding digit as a digit value digit_A, i.e., a "suggested digit" to be output by detector 1 if the current frame is determined to be frame of a valid DTMF signal. It is noted that Goertzel module 10 can generate such a suggested digit for any incoming signal frame, even if the frame turns out not to be a frame of a valid DTMF signal. As explained below with reference to FIGS. 6A and 6B, a presently preferred embodiment of the invention uses the suggested digit in the low level decision module 60 for the frame decision of the current frame. Preferably, module 60 also uses the suggested digit digit_A in other comparisons to be used in the final determination of whether the incoming signal represents a DTMF digit.

Neural Network

An unusual and novel feature of detector 1 resides in the use of a decision unit that generates a decision level using multidimensional thresholding of the indices. Neural network 40 is a preferred embodiment of this decision unit. More generally, such a decision unit will generate a decision level for the current frame based on a linear combination of two or more of the indices. Here "linear combination" means a sum of two or more products, each product being formed by multiplying a value (such as one of the indices) by a corresponding constant value. It will be assumed that at least two of the constant values included in the linear combination are non-zero, whereby the sum is a sum of two or more nonzero values. Preferably, the decision level is based on a linear combination of all four of the indices generated by low-level decision logic 30.

In detector 1, therefore, the decision level is a single value that can be tested against a single threshold level. However, the decision level incorporates information about all of the indices included in the linear combination. In contrast, the usual practice with existing detectors has been to test one or more indices separately against corresponding threshold levels. It has been discovered that this usual practice (i.e., using separate thresholds for the indices tested) is actually a special case of testing the value of a function that combines one or more indices together.

It has also been discovered that detectors using this special case of threshold testing necessarily produce suboptimal detection results, because the space of detectable signals is divided suboptimally. By performing its detection function, every detector divides the detectable signals into two categories or regions: a region deemed to be MF signals, and a region deemed to be non-MF signals. The accuracy of the detector is determined by the degree to which these two deemed regions agree with the actual division between the MF signals and the non-MF signals. Further, the boundary between these deemed regions in the space of detectable signals is determined by the threshold conditions used to determine whether an incoming signal is or is not a MF signal.

It follows that selection of the threshold conditions from a special subset (separate thresholding of individual indices) will prevent an optimum division of the space of signals. In other words, it has been discovered that a detector using single-index thresholding has a less-than-optimal accuracy for distinguishing between MF signals and non-MF signals.

Here, in contrast, optimization of the detector's performance can include selection of the constants of the linear combination, as well as selection of the threshold value. A decision level is generated based on a linear combination of the indices, thereby incorporating two or more indices into the condition that divides the space of detectable signals. If calculation of the decision level includes further processing steps in addition to calculation of the linear combination, then those processing steps can also be adjusted in the optimization process. This allows the space of signals to be divided more accurately between MF signals and non-MF signals. On the other hand, selection of the linear combination and any intermediate processing steps may significantly complicate the process of optimizing the detector.

Figure 3:
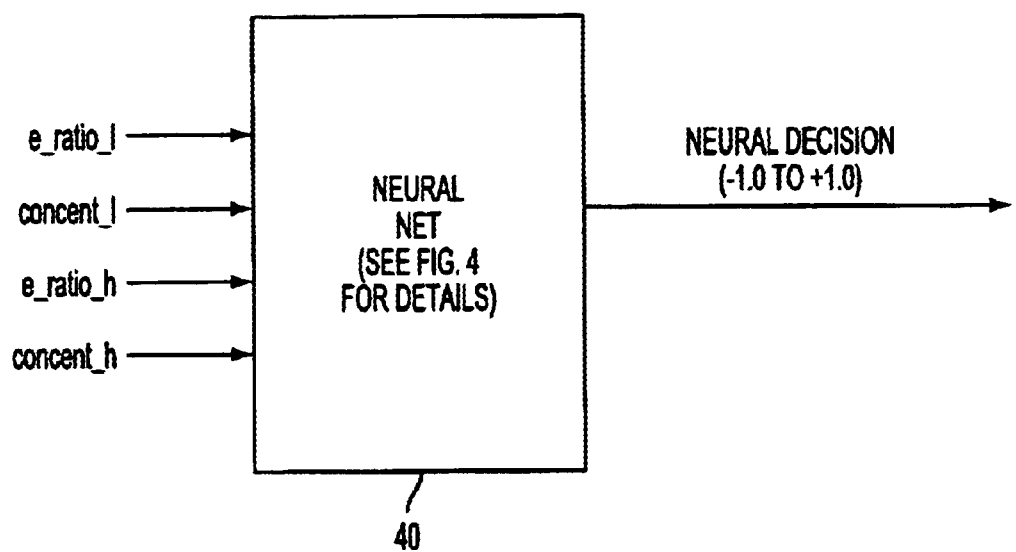
FIG. 3 is a block diagram showing the inputs and output of the neural network block of FIG. 1A.

In view of this significant potential complication, detector 1 preferably includes neural network 40 as the decision unit. FIG. 3 illustrates neural network 40 with several input values and a decision level output. In a preferred implementation, the input values were the four indices e_ratio_l, e_ratio_h, concent_l, and concent_h. In this embodiment the decision level, or "neural decision," can take any value between −1.0 and +1.0. The range for the decision level depends on the specific implementation of neural network 40, as explained below.

Figure 4:
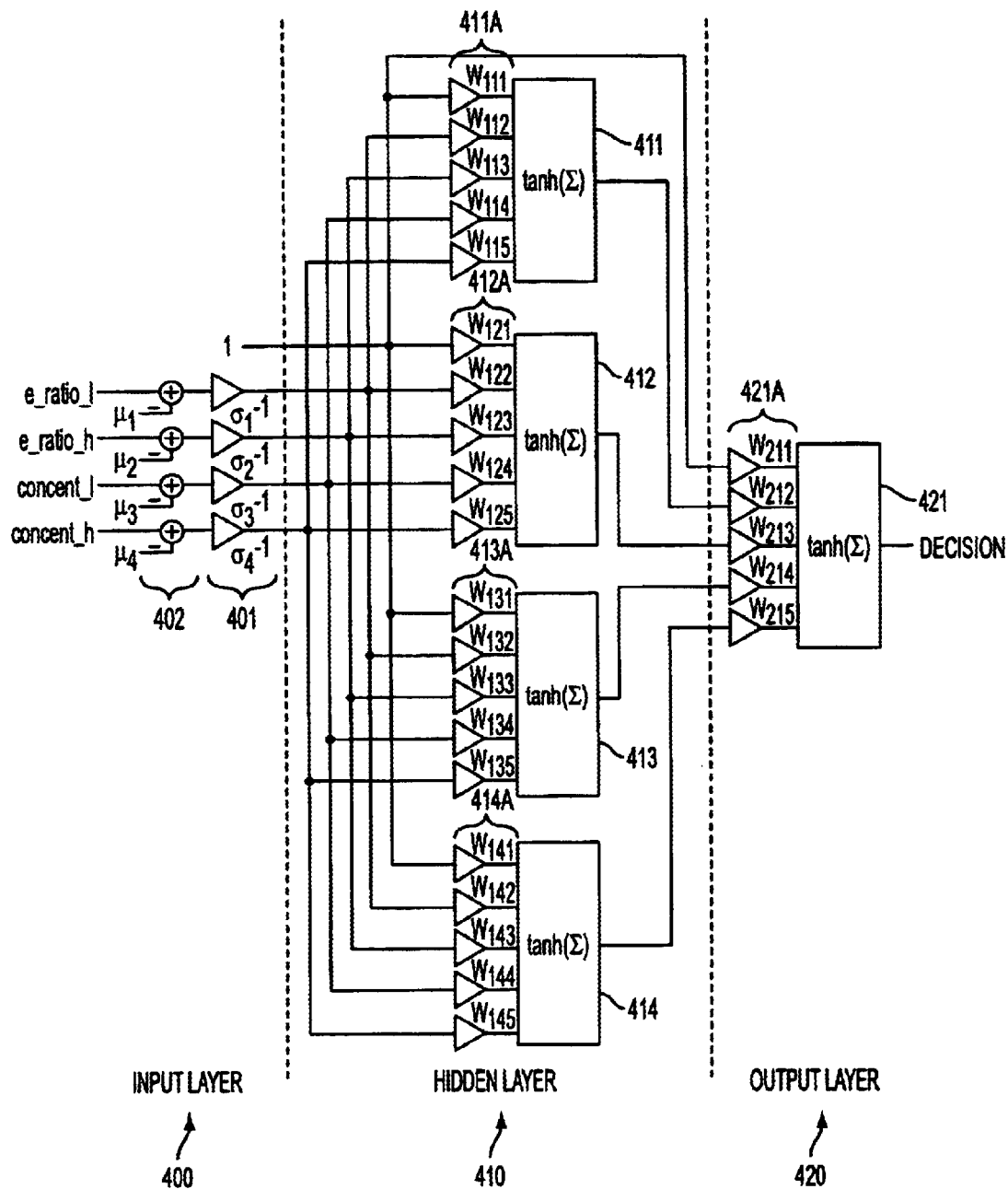
FIG. 4 is a detailed block diagram of the neural network of FIGS. 1A and 3.

FIG. 4 shows a particular implementation of neural network 40 comprising multiple processing layers. An input layer 400 includes a multiplier 401 and a summer 402 for each input ratio. Summers 402 add to each ratio a corresponding additive weight $\mu_i$, such as $\mu_1$, $\mu_2$, $\mu_3$, or $\mu_4$. Multipliers 401 multiply the results of summers 402 by respective multiplicative weights $\sigma_1^{-1}$, $\sigma_2^{-1}$, $\sigma_3^{-1}$, and $\sigma_4^{-1}$. The values of the weights $\mu_i$ and $\sigma_i^{-1}$ may be determined separately in a training procedure to be described. Alternatively, corresponding weights of a hidden layer (to be described below) may be modified to include the values of the $\mu_i$ and $\sigma_i^{-1}$.

The outputs of multipliers 401, together with a constant value 1, are provided as inputs to a hidden layer 410 comprising several nodes. In a preferred embodiment, hidden layer 410 comprises four nodes 411, 412, 413, and 414. However, other numbers of nodes in the hidden layer are also possible. A multiplier bank 411A receives the constant 1 and the outputs of multipliers 401, multiplies the received values by respective weights $W_{111}$, $W_{112}$, $W_{113}$, $W_{114}$, and $W_{115}$, and passes the weighted values to node 411 as inputs. Similarly, multiplier banks 412A, 413A, and 414A multiply the received values by corresponding weights and respectively transfer the weighted values to nodes 412–414.

Output layer 420 resembles hidden layer 410 but may include only a single node 421 and associated multiplier bank 421A. The outputs of nodes 411–414, along with the constant value 1, are multiplied by respective weights $W_{211}, \ldots, W_{215}$ and the weighted values transferred to node 421. The output of node 421 is the decision level output from neural network 40. In the presently preferred embodiment, as explained below, low-level decision module 60 will identify a frame as a DTMF frame (frame decision result "D") only if the decision level exceeds a predefined threshold level.

Each of the nodes in hidden layer 410 and output layer 420 generates a sum $\Sigma$ of the inputs to the node. A nonlinear transformation is then applied to $\Sigma$ according to the usual practice with neural network neurons. The invention can be implemented with any of a wide variety of nonlinear transformations $T(\Sigma)$ satisfying the following conditions:

$T(\Sigma) \to +1$ as $\Sigma \to +\infty$;

$T(\Sigma) \to -1$ as $\Sigma \to -\infty$; and $T(0)=0$.

A nonlinear transformation satisfying these conditions will be called a "threshold transformation". Such threshold transformations encompass the three types of nonlinear transformations typical to neural network neurons, i.e., step functions ("hard limiters"), ramp functions ("threshold logic"), and differentiable functions monotonically increasing to unity ("sigmoid"). In practice, a threshold transformation need not be differentiable or even continuous and may even be implemented as a look-up table. In a presently preferred embodiment, each of the nodes uses the hyperbolic tangent function, $h(x)=\tan h(x)$, as the threshold transformation.

The nodes of neural network 40 may differ from conventional neurons in their use of the threshold weights $W_{ijl}$ multiplied by the constant function 1. A neuron in a typical neural network will fire (generate a nonzero output) only if the sum of the (weighted) inputs exceeds a threshold value $\theta$. If the threshold value $\theta$ exceeds the sum of the other weighted inputs, then the neuron does not fire, i.e., generates a null output.

In contrast, the nodes of neural network 40 may be configured to fire always and to output the result of a nonlinear transformation of the sum $\Sigma$ (which includes the corresponding weight $W_{ijl}$). Thus, multipliers 421A in output layer 420 may receive inputs that are positive, zero, or negative in value. Node 421 similarly generates the decision level as a real number between −1 and +1.

This arrangement has the advantage that branch points in the individual nodes are avoided, whereby the network architecture of network 40 need not be carried forward in the operational mode. In other words, once the weights $\mu_i$, $\sigma_i^{-1}$, and $W_{ijk}$ have been determined, the decision level can be computed by a conventional procedural computation without separate processing modules for the computations associated with each node.

The values of the weights $\mu_i$, $\sigma_i^{-1}$, and $W_{ijk}$ are computed off-line in a training procedure that "teaches" neural network 40 to classify frames correctly as DTMF frames or non-DTMF frames. The training operation employs conventional back-propagation, which is well known in the art of neural networks. During the training stage, the neural network is supplied with numerous sampled signals from a signals database 100 that may contain both DTMF signals and other signals (such as voice, fax/modem signals, noise, and so forth). In the presently preferred embodiment, the weights are initialized to random values and the sampled signals are supplied to the neural network in a random sequence. The weights are iteratively adjusted to minimize the frequency of incorrect frame decision results.

The effectiveness of the back-propagation training depends on the range of signals represented by signals database 100 in relation to the actual signaling environment in which detector 1 will be expected to perform. Thus, it has been found that the overall performance of the optimized detector 1 can be improved by modifying signals database 100 in view of performance results in the signaling environment and then retraining the neural network. The overall training procedure, including such database modification and retraining, will be described further with reference to FIG. 9.

Frequency Estimation Module

Figure 5:
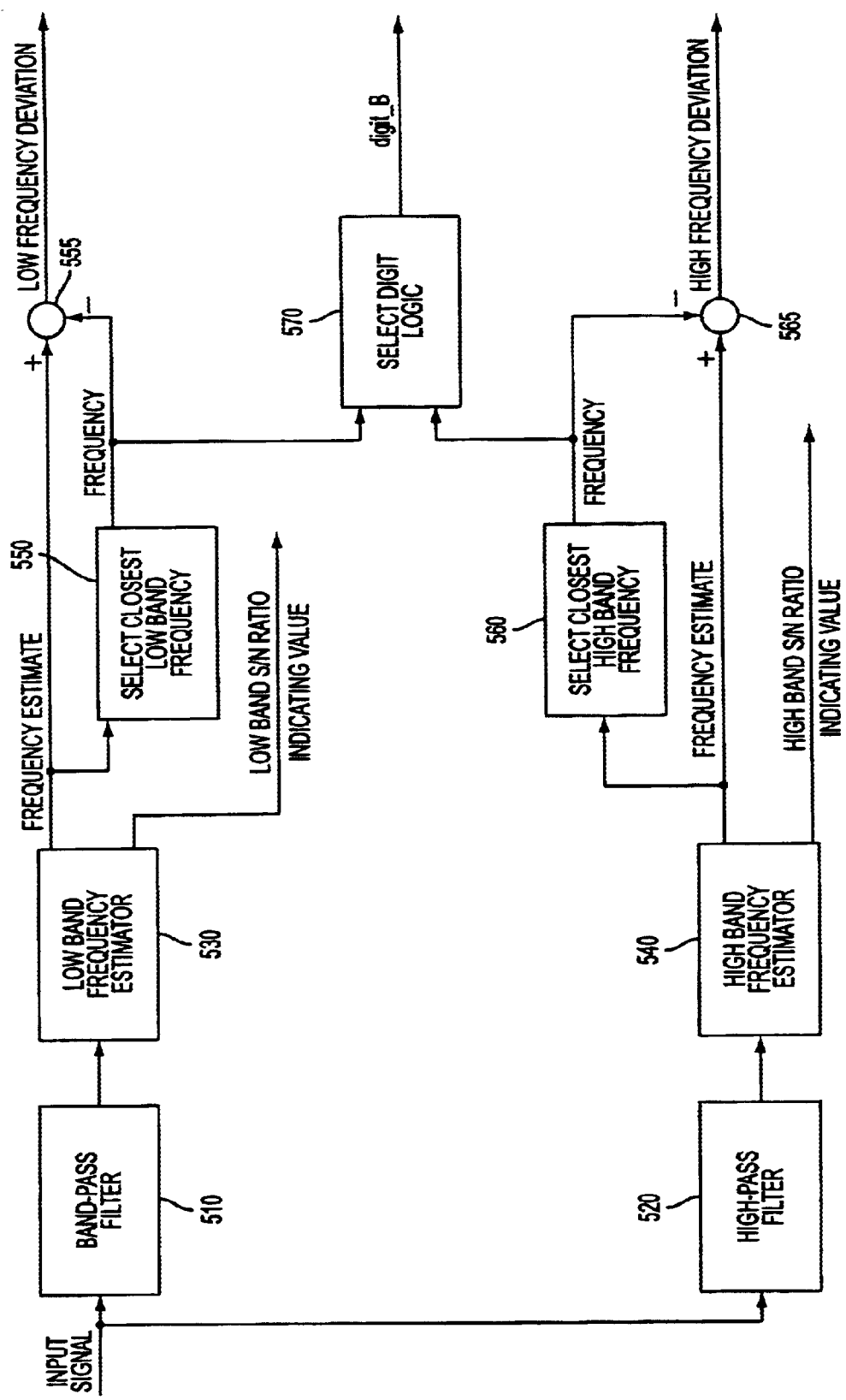
FIG. 5 is a detailed block diagram of the frequency estimation module of FIG. 1A.

FIG. 5 illustrates a preferred embodiment of frequency estimation module 50. As shown in FIGS. 1A and 1B, an input signal buffer (105 samples) is input to a band-pass filter 510 and a high-pass filter 520. Filters 510 and 520 respectively separate a low-band component and a high-band component from the input signal frame. The low-band component is applied to a low-band frequency estimator 530, which generates a low-band frequency estimate and a value indicating a signal-to-noise ratio (SNR) for the low band component. A high-band frequency estimator 540 similarly generates a high-band frequency estimate and a value indicating a signal-to-noise ratio (SNR) value for the high-band component.

Frequency estimators 530 and 540 preferably generate high-band and low-band SNR-indicating values that are directly related to the SNR calculated according to the equations presented below. For example, such an SNR-indicating value may be the value SNR itself or the reciprocal value $SNR^{-1}$. Here a signal to noise ratio (SNR) is any ratio of a signal value to a noise value. A signal to noise ratio may be a ratio of a signal energy to a sum of a signal energy and a noise energy for the frame, for example.

More generally, the present invention encompasses a frequency estimation module that generates values indicating the relative strength of information as compared with noise in the incoming signal. Such values indicating relative strength will be termed "comparative signal quality values" and may be SNR values or reciprocal SNR values, as described above, or any other computable values providing suitable indications of relative information strength.

Selection logic unit 550 selects the standard low-band DTMF frequency closest to the low-band frequency estimate. The selected low-band frequency is subtracted from the low-band frequency estimate at adder 555 to generate a low-band frequency deviation value. Similarly, selection logic unit 560 selects the standard high-band DTMF frequency closest to the high-band frequency estimate. The selected high-band frequency is subtracted from the high-band frequency estimate by adder 565 to generate a high-band frequency deviation value. The selected high-band and low-band frequencies are also supplied to digit selection logic 570, which selects the DTMF digit, digit__B, corresponding to the selected pair of frequencies. Digit__B is used by low-level decision module 60 in performing the current frame decision.

In the presently preferred embodiment of the invention, frequency estimators 530, 540 use a correlation method for calculating their respective estimated frequencies. For each filtered frame (a series of N samples x(n), with $0 \leq n < N$), the following values are calculated:

$$X_i = \frac{x(i) + x(i-2)}{2}; \quad Y_i = x(i-1); \quad i = 2, \ldots, N-1$$

$$\alpha = \frac{2 \sum_{i=2}^{N-1} X_i \cdot Y_i}{\sum_{i=2}^{N-1} X_i^2 - \sum_{i=2}^{N-1} Y_i^2}$$

$$\phi = \frac{1}{\alpha}\left[-1 \pm \sqrt{1 + \alpha^2}\right]$$

Using the value of $\phi$ that satisfies the condition $|\phi| > 1$, the estimated frequency is $$f = \frac{f_s}{2\pi} \cos^{-1}\left(\frac{1}{\phi}\right),$$

where $f_s$ is the sampling frequency. In the presently preferred embodiment, $f_s = 8000$ Hz.

The estimation of the signal-to-noise ratio SNR is performed according to the formula $$SNR \cong \frac{\phi^2 \sum_{i=2}^{N-1} X_i^2}{\sum_{i=2}^{N-1} Y_i^2 - 2\phi \sum_{i=2}^{N-1} X_i Y_i + \phi^2 \sum_{i=2}^{N-1} X_i^2}$$

Frequency estimation module 50 thus uses the estimates generated by frequency estimators 530, 540 to make several determinations. First, module 50 can make a determination about which digit was dialed. Second, the absolute frequency deviation of each tone of the digit from the tone's nominal value can be estimated (expressed in terms of percent of the nominal value), as well as the reliability of the frequency estimation results. The dialed digit is determined by finding the two nominal frequencies that are closest to the estimated frequencies, using selection logic 550, 560, and selecting the corresponding digit using digit selection logic 570. The digit thus selected will be called an "estimated digit." Also, it is noted that the reliability of the estimation results decreases as the SNR of each component decreases.

An unusual and novel feature of detector 1 resides in the fact that the outputs of frequency estimation module 50 are not necessarily employed directly in tone identification, even if it is found that that the current frame is a valid DTMF frame. As noted above, frequency estimation has been proposed as an alternative to DFT-type techniques (such as Goertzel filtering) for digit identification. According to such proposals, frequency estimators can be used to identify one or more dominant frequencies of an incoming signal, and those frequencies can be analyzed to determine which digit, if any, is represented by the signal. Unfortunately, as the present inventors have found, frequency estimators perform poorly as DTMF digit detectors per se and would not be suitable for most field installations.

The present invention implements the interesting discovery that frequency detection, while ineffective for direct digit detection, can be used to enhance the performance of DFT-type detector systems. Rather than identifying a digit from the frequencies output by the frequency detectors, the invention uses the results of Goertzel module 10 for digit identification. The outputs of frequency estimation module 50 are used to enhance the reliability of the frame decisions performed by low-level decision module 60. In the presently preferred embodiment, digit__B is used only as input for resetting the counter value COUNTER supplied to state machine 80.

Of course, digit__B could also be used more directly for identifying the digit represented by a valid DTMF signal. Here, though, the main point is the discovery that frame decision and digit detection functions in a MF detector are subtly interrelated. Frequency estimation typically has been considered as a means for identifying DTMF digits. In the present invention, on the other hand, frequency detection actually has value for enhancing the accuracy of the final digit detection result for each frame. According to the present invention, secondary results of frequency estimation (signal-to-noise ratio values and frequency deviation values, in a specific embodiment) are used to improve the selectivity and sensitivity of low-level decision module 60. The preferred embodiment then uses the suggested digit from Goertzel module 10, digit__A, as the detected DTMF digit when the current frame is determined to be a valid DTMF frame.

Low-Level Decision Module

Figure 6A:
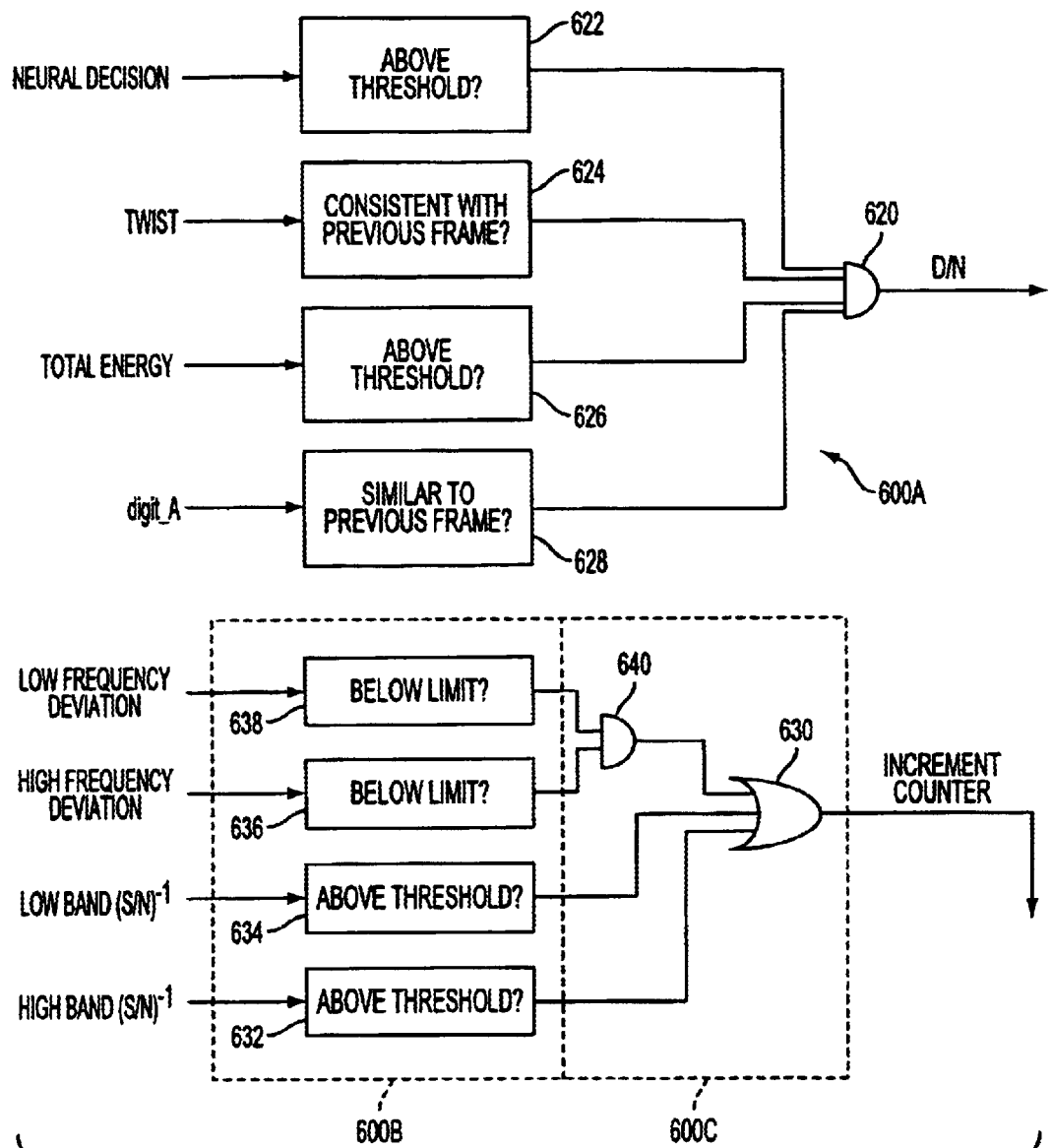
FIGS. 6A–B show a detailed block diagram of the low-level decision module of FIG. 1A.
Figure 6B:
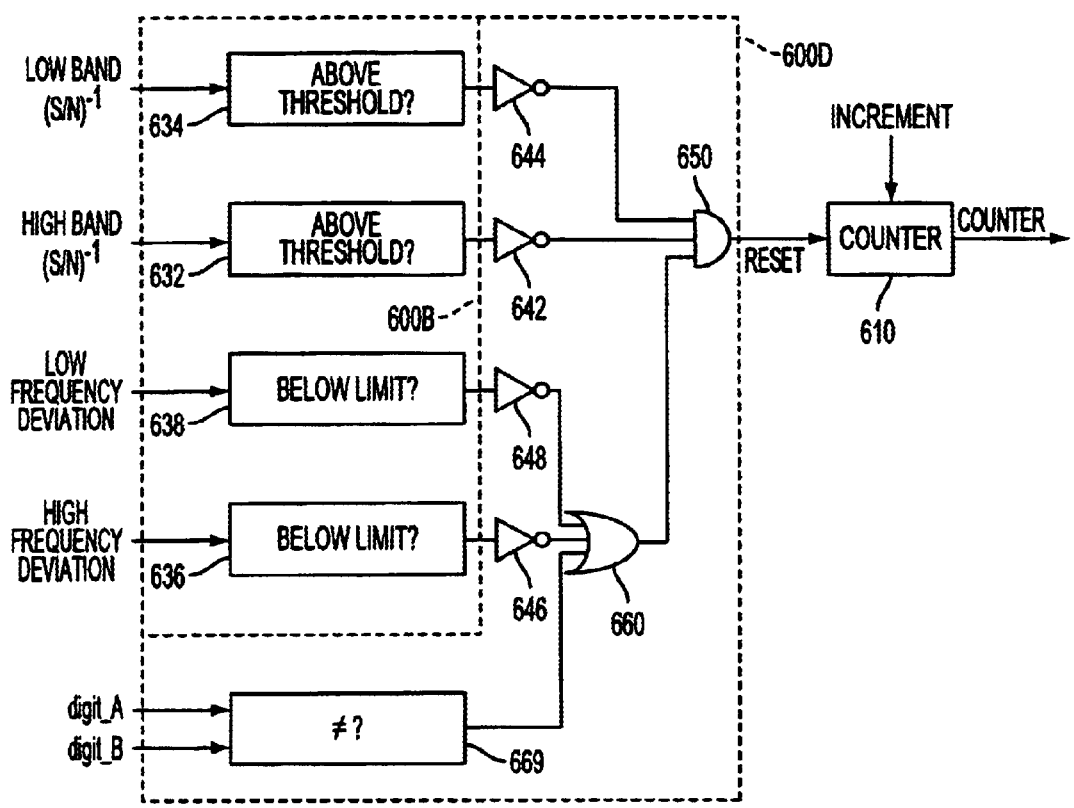

FIGS. 6A–6B show that low-level decision module 60 may include a frame decision section 600A, a frequency comparison section 600B, a counter increment section 600C, a counter reset section 600D, and a counter 610. These sections perform two functions: frame decisions for incoming frames, and carrying out extra tests as described below.

Frame decision section 600A performs a frame decision for each frame to make an initial determination about whether the frame contains a valid DTMF signal (i.e., the frame is a "DTMF frame"). In the affirmative case, when a valid DTMF frame is detected, the frame will be labeled "D." The converse case of a non-DTMF frame will be labeled "N."

Frame decision section 600A classifies the current frame as a DTMF frame (D) if ALL of the following four conditions are satisfied:

F1. the decision level output from neural network 40 is above a pre-set threshold level;

F2. the calculated value of energy twist for the current frame is consistent with the corresponding twist value for the previous frame;

F3. the energy of the frame is above a low-limit threshold; and

F4. the suggested digit, digit_A, is the same as the suggested digit from the previous frame.

For most frames, violation of any of conditions F1–F4 causes section 600A to label the frame as a non-DTMF frame (N). However, in a preferred embodiment, conditions F2 and F4 are not tested for some frames. The omission of condition F2 relates to the fact that a frame may be labeled a D frame if it is the first D frame following an N frame. Condition F2 is not tested in this case because the twist value of the previous, non-DTMF frame (an N frame) is not expected to be consistent with the twist of the current frame, even if the current frame is a true DTMF frame. Similarly, a suggested digit for a previous, non-DTMF frame will be unpredictable. Condition F4 is not tested in this situation because there is no expectation that the suggested digit for the current frame will be the same as the suggested digit for the previous frame, even if the current frame is a true DTMF frame.

In the following description, various logic gates will be described according to the typical configuration in which affirmative inputs and outputs correspond to HIGH logic levels. Of course, by addition of appropriate inverters in the manner well understood in the art of digital logic, any of these gates can be configured so that an affirmative input or output corresponds to a LOW logic level.

In section 600A, an AND gate 620 outputs a frame decision result "D" when the four inputs thereto are affirmative. Comparison logic 622 compares the decision level (neural decision) from neural network 40 to a neural decision threshold level $T_1$ (condition F1). A higher threshold level $T_1$ increases the detector's talk-off immunity, but decreases talk-down immunity (i.e., the number of misdetections is higher with a higher threshold level). Thus, the threshold level $T_1$ should be set to a value that achieves an appropriate balance between sensitivity and selectivity of the detector. In a particular implementation of the presently preferred embodiment, the threshold level $T_1$ was set to zero.

Comparison logic 624 performs the consistency comparison between the twist values for the current frame and the previous frame (condition F2). The presently preferred embodiment classifies the current and previous frame twist values as "consistent" when the ratio of current-frame twist to previous frame twist falls within the range of $T_2^{-1}$ to $T_2$, where $T_2$ is a second threshold constant. In a particular implementation, $T_2$ was set to 2.8. This consistency range was determined by experiment.

Comparison logic 626 performs the total energy threshold comparison (condition F3). In the presently preferred embodiment, a low-limit threshold $T_3$ for the total frame energy is determined according to the specific requirements the detector is desired to meet. For example, in one implementation the low-limit threshold $T_3$ was set to a value of −51 dB.

Comparison logic 629 compares the value of digit_A for the current frame to digit_A for the previous frame (condition F4).

Counter 610 is incremented and reset based on additional information about the current frame. In the presently preferred embodiment, detector 1 determines that the current frame corresponds to the start of a DTMF digit when the frame has been identified as a D-type frame (i.e., frame decision result "D") and counter 610 has a sufficiently high value. A decision to increment counter 610 will therefore increase the likelihood that a digit start will be detected at the current frame or a following frame. It has been found that accumulating signal quality indications, such as by counter 610, increases the reliability of the detector's digit detections. Moreover, such accumulation enhances the detector's ability to overcome instantaneous impairments in the incoming signal, such as energy drops, noise, or any other impairments. One particular advantage of this accumulation is that the detector can perform digit detection even when the signal is noisy, yet the rate of talk-offs (erroneous digit detection results) is reduced.

Counter 610 accumulates indications from frequency estimation module 50 that are relevant to the final digit detection result generated by high-level decision module 70. Counter increment section 600C increments the value COUNTER held by counter 610 based on four comparison outputs from frequency comparison section 600B. The comparison outputs from comparison section 600B relate to the values output by frequency module 50: low-frequency deviation, high-frequency deviation, low-band (LB) SNR-indicating value, and high-band (HB) SNR-indicating value.

An OR gate 630 of counter increment section 600C increments counter 610 when any of three inputs from frequency comparison section 600B is affirmative. The first input is from a comparison logic 632 that performs a threshold comparison to determine whether the HB SNR is below a minimum value required for reliability of the frequency estimation result. FIGS. 6A–6B show the case of a specific preferred embodiment in which logic 632 compares the reciprocal of HB SNR (i.e., $HBSNR^{-1}$) to a fourth threshold value $T_4$. A particular implementation of this embodiment used a threshold value $T_4=0.1$.

Comparison logic 634 performs a similar threshold comparison to determine whether the LB SNR is below a minimum value required for reliability of the frequency estimation result. In the preferred embodiment shown in FIGS. 6A–6B, logic 634 compares the reciprocal of LB SNR (i.e., $LBSNR^{-1}$) to a fifth threshold value $T_5$ to generate the second input to OR gate 630. The particular implementation used a threshold value $T_5=0.01$. When either $LBSNR^{-1}$ or $HBSNR^{-1}$ exceeds the relevant threshold, an unreliable frequency estimation is indicated. Of course, the SNR of a signal and the reciprocal of the SNR both represent quality information indicating signal quality. Whether frequency estimation module 50 outputs the SNR, the reciprocal of the SNR, or another comparative signal quality value is not essential, and any such configuration is contemplated for the present invention.

The third input to OR gate 630 is based on the frequency deviations of the tones in both the nominal frequency bands of the detector. Comparison logic 636 in frequency comparison section 600B determines whether the high-frequency deviation is within a maximum allowed deviation $T_6$. Comparison logic 638 determines whether the low-frequency deviation is within a maximum allowed deviation $T_7$. In a particular implementation, the values of $T_6$ and $T_7$ were both set at 3% in accordance with specified performance requirements. An AND gate 640 in counter increment section 600C generates an affirmative third input to OR gate 630 when both comparison logic 636 (high-frequency deviation) and comparison logic 638 (low-frequency deviation) generate affirmative results.

Counter increment section 600C therefore increments counter 610 by one when either of the following two conditions is satisfied:

I1. The SNR estimate for at least one of the tones fails to satisfy a threshold condition, thereby indicating inadequate reliability (for example, $HBSNR_{-1}>T_4$ or $LBSNR^{-1}>T_5$); or I2. the frequency deviations of BOTH tones are lower than the corresponding maximum allowed deviations ($T_6$ and $T_7$, respectively).

That is, in a preferred embodiment counter 610 is incremented upon detecting either of two signal conditions that are consistent with the current frame being part of a DTMF digit. The first condition is when either one (or both) of the bands of the incoming signal is noisy (condition I1). In this situation a substantial frequency deviation may exist that would otherwise indicate a non-DTMF signal frame. Because the signal quality is low, however, the possibility also exists that the deviation is caused by distortion of a true DTMF signal. Condition I1 makes the detector more tolerant of frequency deviations when the signal quality is low. Use of this additional information enables the resulting detector to have excellent sensitivity while maintaining good selectivity (i.e., while maintaining the rate of talk-offs).

Second, counter 610 is incremented if the estimated frequencies are both close to nominal DTMF frequencies, i.e., have low frequency deviation in both bands (condition I2). This condition applies whether or not the signal quality is good. A frame having both good signal quality and good tone accuracy is thereby identified as potentially indicating a start-of-digit condition. Detection sensitivity is maintained, even when the detector's performance is optimized for high selectivity (i.e., low talk-off rate).

On the other hand, counter 610 is reset if the signal quality is good (e.g., high SNR) and either one of the estimated frequencies deviates too much from the closest nominal frequency. In such a case the tones of the received signal fail to correspond to a DTMF digit, and the received signal also can be expected to have high fidelity to the transmitted signal. These conditions reliably indicate that the signal does not to represent a DTMF digit.

Counter reset section 600D resets the value COUNTER held by counter 610 based on digit__A from Goertzel module 10, digit__B from frequency estimation module 50, and the comparison results output from frequency comparison section 600B. The comparison results from comparison logic units 632, 634, 636, and 638 are inverted by inverters 642, 644, 646, and 648, respectively. An AND gate 650 has three inputs and resets COUNTER to zero when all three inputs are affirmative. Two inputs to AND gate 650 are respectively received from inverters 642 and 644 and represent the complements of comparison logic units 632 and 634, respectively. The third input to AND gate 650 is received from an OR gate 660 and is affirmative when any of three inputs to gate 660 are affirmative.

Two inputs to OR gate 660 are received from the second half of frequency comparison section 600B, through inverters 646 and 648, respectively. A third input to gate 660 is received from a comparison logic 669, which compares the value of digit__A (from Goertzel module 10) to the value of digit__B (from frequency estimation module 50). The output of comparison logic 669 is affirmative when digit__A≠digit__B.

Counter reset section 600D therefore resets counter 610 to zero when the following conditions are satisfied:

R1. both the high band and the low band SNR estimates satisfy the corresponding threshold conditions (for example, $HBSNR^{-1} \leq T_4$ and $LBSNR^{-1} \leq T_5$); and either R2.1. the estimated frequency deviation of either the high band or the low band, or of both, is above the corresponding threshold ($T_6$ or $T_7$); or R2.2. the estimated digit according to frequency estimation module 50, digit__B, is different from the suggested digit according to the Goerztel module 10, digit__A.

As will be seen, resetting counter 610 has the effect of preventing a start-of-digit condition from being detected both at the current frame and at the next frame. In a preferred embodiment, counter 610 is reset only when the signal quality is good in both bands (e.g., high SNR) (condition R1). If either of the SNR estimates fails the test, then the counter is incremented (condition I2) and conditions R2.1 and R2.2 need not even be tested. But if condition R1 is satisfied, then the frequency estimates from frequency estimation module 50 are reliable. If so, and if the frequency deviation in either band is too high, then the signal at the current frame can be identified with confidence as a non-DTMF signal (condition R2.1).

Conversely, a non-DTMF signal frame may have good signal quality (e.g., high SNR in both bands) and happen to satisfy both of the frequency deviation thresholds. This situation is identified by comparing the estimated digit (digit__B, the digit generated from the estimated frequencies) to the suggested digit (digit__A, the digit generated by Goertzel module 10 from the energy distribution). Counter 610 is reset if the two digits do not match (condition R2.2).

High-Level Decision Module

Figure 7:
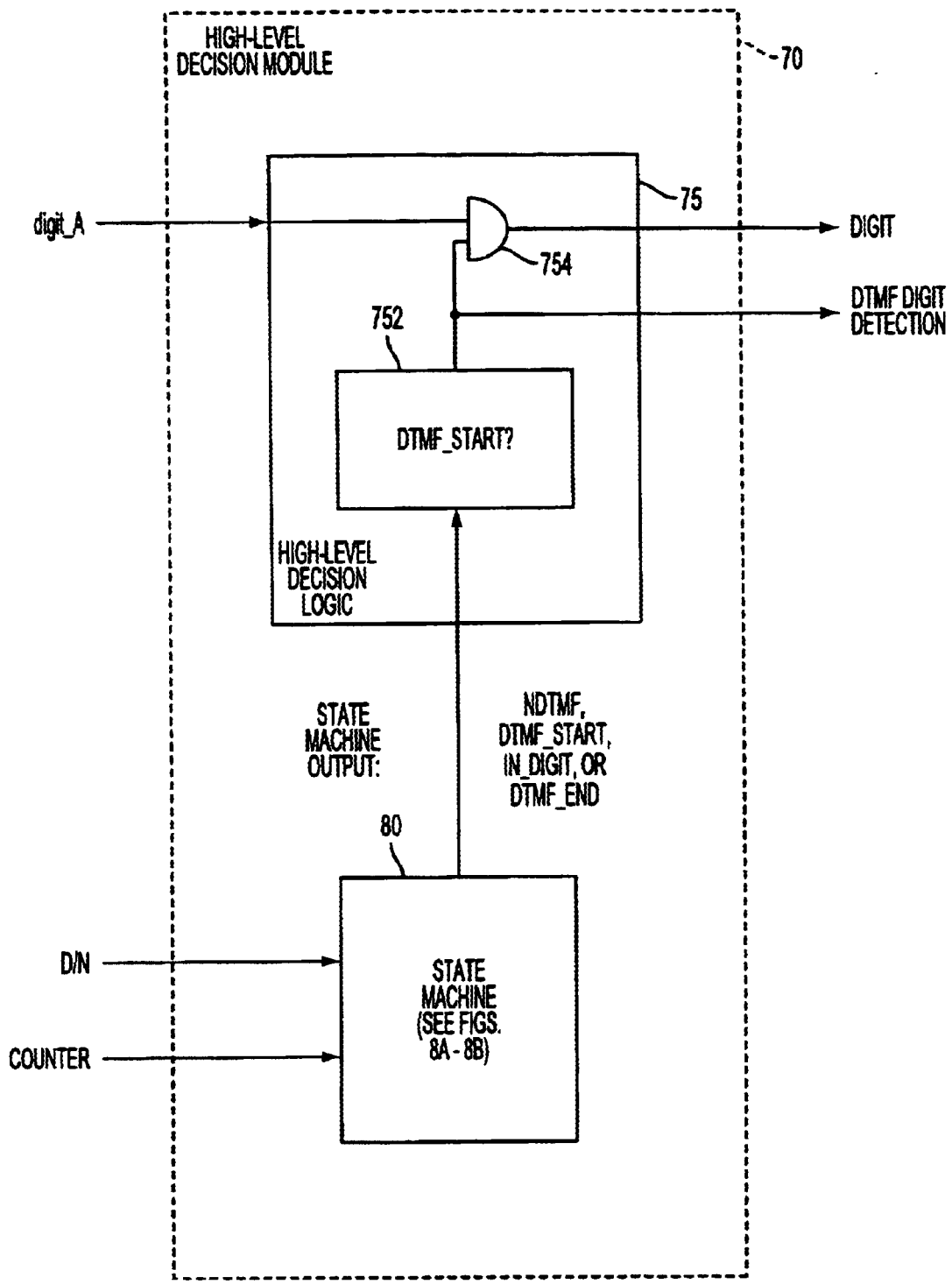
FIG. 7 is a block diagram showing details of the high-level decision module of FIG. 1A.
Figure 8A:
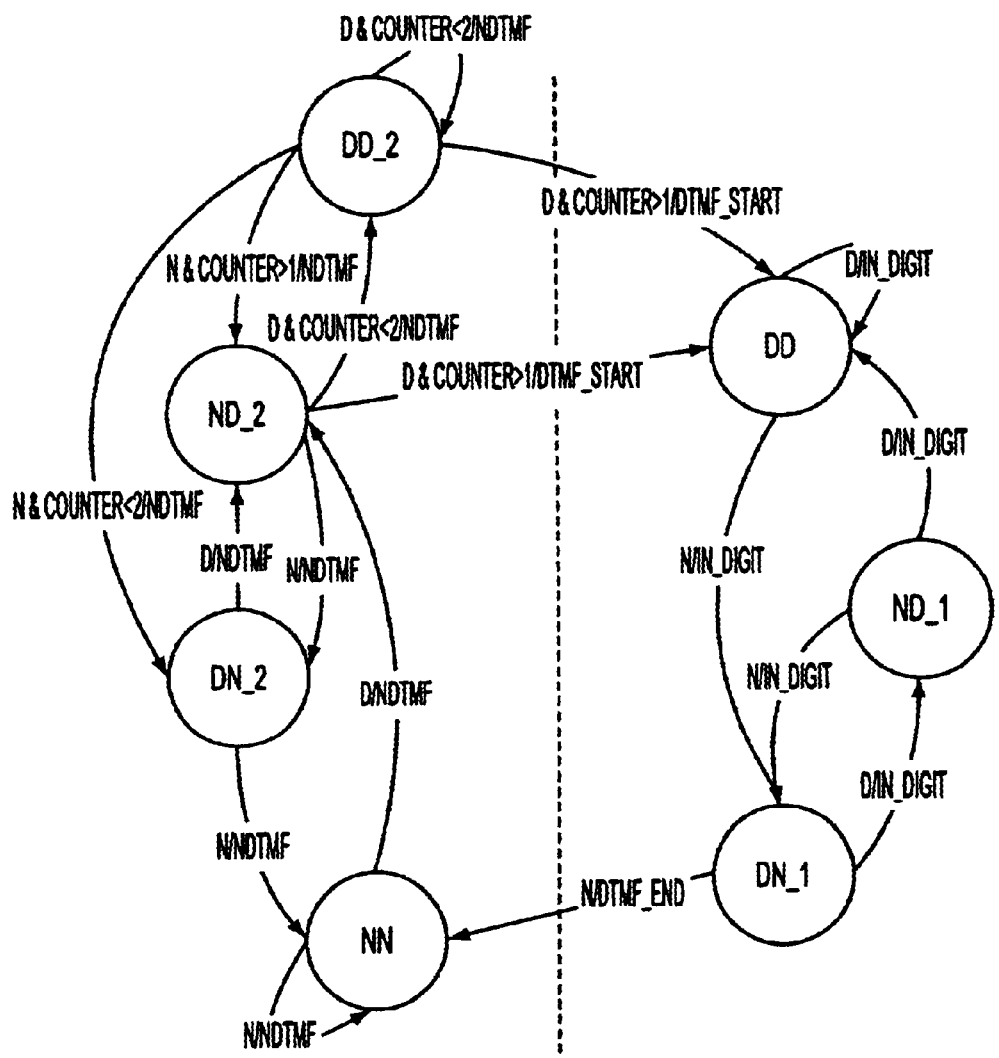
FIG. 8A is a state transition diagram for a first embodiment of the state machine shown in FIGS. 1A and 7.
Figure 8B:
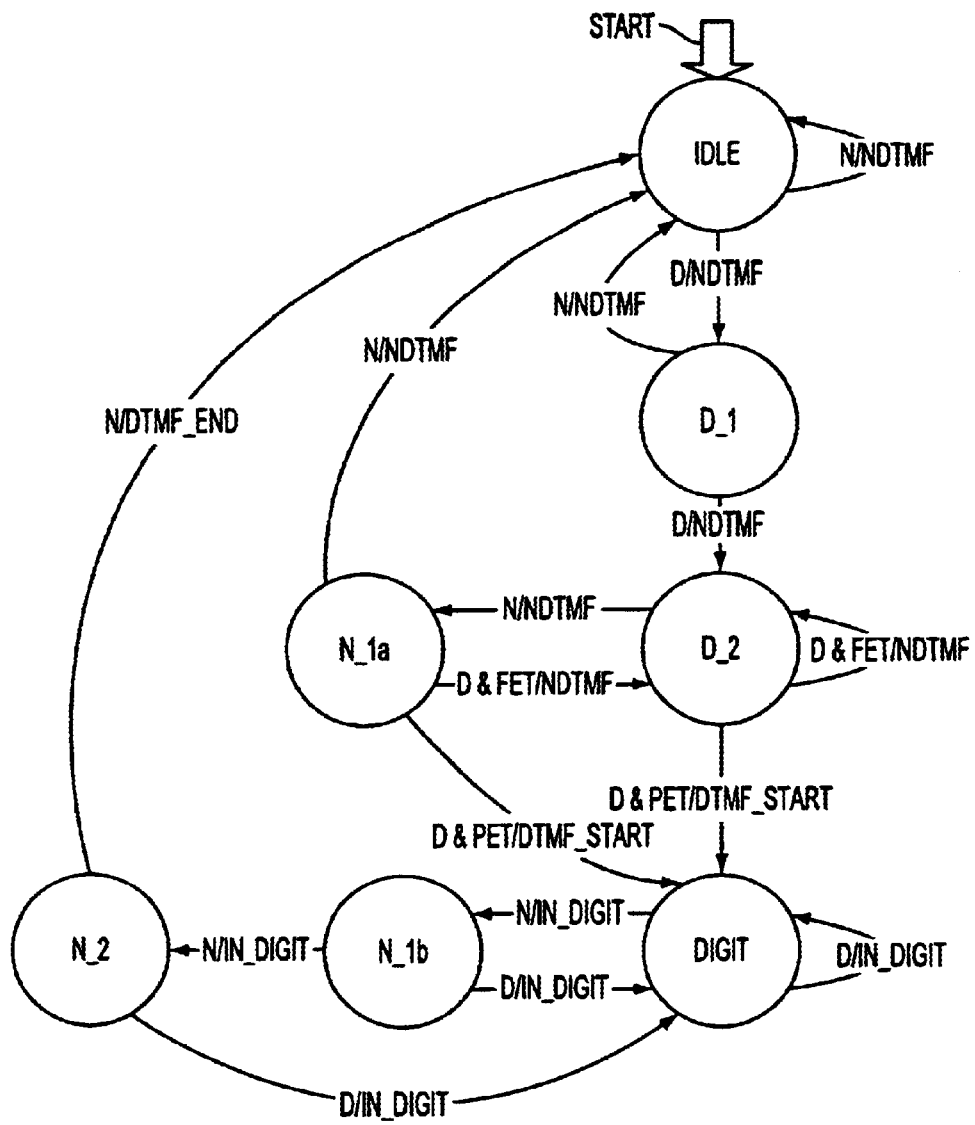
FIG. 8B is a state transition diagram for a second embodiment of the state machine shown in FIGS. 1A and 7.

FIG. 7 depicts details of high-level decision module 70 including high-level decision logic 75 and state machine 80. The D/N decision result and COUNTER are supplied to state machine 80 from low-level decision module 60. State machine 80 processes the D/N input and the value COUNTER, to decide whether a valid DTMF digit was transmitted. The state structure and outputs of state machine 80 are sufficiently sophisticated to overcome interruptions in the input signal that are not longer than one frame. For each frame, state machine 80 returns one of four outputs shown in Table 1:

TABLE 1

| STATE MACHINE OUTPUT | INDICATION |
|---|---|
| NDTMF | signal of current frame is non-DTMF digit |
| DTMF__ START | current frame starts a DTMF digit (because the detector uses three D frames to detect a digit, this indication comes two or more frames after the real start of the DTMF digit) |
| IN__ DIGIT | current frame continues DTMF digit |
| DTMF__ END | current frame ends a DTMF digit (because the detector uses two N frames to end a digit, this indication comes one or more frames after the real end of the DTMF digit) |

High-level decision logic 75 includes a comparison logic 752 that receives the output of state machine 80 and determines whether the start of a DTMF digit has been detected (DTMF__START). The result from logic 752 is output from detector 1 as a DTMF detection result indicating whether the transmitted signal contains a DTMF digit. This output is affirmative for a frame when state machine 80 detects the start of a DTMF digit. As noted in Table 1, a preferred embodiment uses three D frames to detect the start of a digit and thereby incurs a delay of two frames. Generation of the DTMF__START output thus indicates that a DTMF digit started two frames before the current frame.

An AND gate 754 also receives the output of comparison logic 752 as a first input. A second input of AND gate 754 is the value digit__A, received by high-level decision module 70 from Goertzel module 10. Thus, when the DTMF digit detection result from high-level decision module 70 is affirmative, high-level decision logic 90 also outputs the value digit__A as the detected DTMF digit.

It is again noted that the present invention does not require a digit identified by frequency estimation module 50 to be used as the detected digit, even when detector 1 determines that a valid DTMF digit was transmitted. As explained below, the role of frequency estimation in the present invention is to enhance the accuracy (selectivity and sensitivity) of determining whether the transmitted signal contains a DTMF digit.

State machine 80 makes this determination through transitions between a number of states. The number of states available for state machine 80 can be chosen as a design parameter for detector 1. The number and arrangement of the states depend on the number of "basic states," i.e., the number of distinct frame decision combinations to which state machine 80 is sensitive. The detection that a valid DTMF digit was transmitted (i.e., an affirmative "digit detection" result) thus depends on a sequence of successive frame decision results D/N for the current and one or more preceding frames.

In a first embodiment, shown in FIG. 8A, four basic states are provided: DD, DN, ND, and NN. These basic states reflect the four possible combinations for frame decision results (D/N) for a frame and the preceding frame. For example, state ND for the current frame reflects a condition in which the current frame is determined to be a DTMF digit frame, while the previous frame was a non-DTMF frame. Thus (with some exceptions as noted below), the basic state is a consequence of the frame decision for a given frame in conjunction with the frame decision for the previous frame.

In FIG. 8A, each state of state machine 80 is indicated by a circle with a descriptive label therein. Arrows between state-circles represent transitions between states. For a transition labeled X/Y, X denotes the current state condition that initiates the transition, and Y denotes the resulting event indication (i.e., state machine output).

The states illustrated in FIG. 8A are split to reflect an "out-of-digit" condition on the left side of the figure and an "in-digit" condition on the right side. This division arises in part because state machine 80 uses extra information (the value COUNTER), in addition to the frame decision result (D/N) in deciding whether a valid DTMF digit was transmitted. State DD__2, for example, results when the preceding frame and the current frame were determined to be D frames by low-level decision module 60 (basic state DD), but COUNTER fails a predetermined test. In the presently preferred embodiment, the test is whether COUNTER satisfies COUNTER>1.

State machine 80 cycles at state DD__2 as long as the next frame is determined to be a D frame but the COUNTER test fails (i.e., COUNTER<2, which implies COUNTER ≯ 1). When the next frame is D and COUNTER passes the test, the state transitions from DD__2 to DD (i.e., from the out-of-digit condition to the in-digit condition). In both the states DD__2 and DD, the basic state is DD: both the current frame and the preceding frame are D frames. The transition from out-of-digit to in-digit thus is a consequence of the COUNTER test being passed. The increment and reset conditions for counter 610 thus give the digit detection result enhanced accuracy through consideration of the frequency deviations and SNR values generated by frequency estimation module 50.

Similarly, ND__2 and ND__1 represent the out-of-digit and in-digit conditions of the basic state ND. State machine 80 transitions from DD__2 to ND__2 when the two preceding frames were determined to be D frames and the COUNTER test is passed by the current frame, but low-level decision module 60 determines that the current frame is N. This is an exception to the general rule for the basic state as noted above, i.e., that the basic state for the current frame is a consequence of the frame decision for the current frame and the preceding frame. In this exceptional case, the state transitions to ND__2 based on the current frame (N) and the two preceding frames (because both were D frames and COUNTER passed the test).

If the current frame is N and the COUNTER test fails, then state machine 80 transitions from DD__2 to DN__2. From state ND__2, state machine 80 transitions back to state DD__2 when the next frame is D, but the COUNTER test fails. All transitions from one out-of-digit state to another out-of-digit state result in output NDTMF from state machine 80.

Once in state DN__2, state machine 80 transitions to state DD (i.e., from out-of-digit to in-digit) when the next frame is D and the COUNTER test is passed. As with the transition DD__2→DD, the output of state machine 80 in the ND__2→DD transition is DTMF__START.

A notable feature of the embodiment illustrated in FIG. 8A is that state machine 80 needs to perform the COUNTER test only from the DD__2 state and the ND__2 state. In other words, transitions from the other five states (DN__2, NN, DD, ND__1, and DN__1) all are determined solely by the frame decision result (D/N). This special dependence of states DD__2 and ND__2 arises from the "closeness" of these states to digit detection.

Indeed, the present invention makes use the discovery that extra conditions (in addition to the frame decision result D/N) can be used to determine whether a state "close" to a DTMF digit is in fact the start of a valid digit. State DD__2 results when two D frames are detected in succession, but the current frame fails the COUNTER test. State ND__2 results when a D frame is detected after preceding N frames (NN→ND__2), or two frames follow an N frame (DN__2→ND__2), or an N frame follows two D frames but the COUNTER test is passed by the N frame (DD__2→ND__2). A DTMF digit is more likely in these situations, and hence it is justified to perform the additional step of testing whether COUNTER>1.

State machine 80 exits the in-digit condition when two N frames are detected in succession (DN__1→NN transition). The output of state machine 80 in this transition is DTMF__END. Furthermore, the DN__1→NN transition is the only exit from the in-digit condition. All other transitions from in-digit states (DD→ND__1, DD→DN__1, ND__1→DN__1, and ND__1→DD) result in the output IN__DIGIT.

FIG. 8B illustrates an alternate configuration for the states and state transitions of state machine 80. As explained above, the value of COUNTER at each frame reflects a number of tests of the indications sent from frequency estimation module 60. The state machine outputs are the same as given in Table 1, except that state machine 80 in this configuration uses detection of three N frames in succession to generate a DTMF__END output. The embodiment of FIG. 8B therefore delays the end-of-digit event by two frames, as compared with one frame for the embodiment of FIG. 8A. State machine 80 as configured in the embodiment of FIG. 8B has the advantage of being able to overcome longer signal interruptions than the embodiment shown in FIG. 8A. This is because the embodiment of FIG. 8B can handle interruptions in two successive frames, whereas the embodiment of FIG. 8A can tolerate signal interruptions of at most one frame in length.

As explained above, an important function of the extra tests is to reduce the incidence of talk-offs. The extra tests enhance the effectiveness of the frame decision result (D/N) for deciding whether a succession of D frames actually indicates the start of a DTMF digit. The extra tests generally are performed only in states from which a DTMF digit can be started. If state machine 80 transitions away from these special states, then the extra tests are not performed. This constraint provides robustness against talk-offs while simultaneously providing robustness against digit splits.

According to the configuration illustrated in FIG. 8B, detector 1 is initialized in a state IDLE, which is a non-digit detection state and corresponds to state NN of FIG. 8A. States D_1 and D_2 are entered in succession upon detection of successive D frames. State machine 80 returns to IDLE when the first D frame is followed by an N frame (D_1→IDLE) or when the second D frame is followed by two N frames in succession (D_2→N_1a→IDLE). All of these state transitions correspond to output NDTMF by state machine 80.

States D_2 and N_1a in FIG. 8B are the special states from which the extra tests are performed. When the current frame is determined to be D but COUNTER<2 (corresponding to "failed extra tests," or "FET"), state machine 80 cycles within state D_2. When the frame is determined to be N, the extra-tests condition is not checked and state machine 80 transitions to state N_1a. When the next frame is D but the extra-tests condition again fails (FET), the state returns to D_2.

From either N_1a or D_2, the concurrence of a D frame with passage of the extra tests ("passed extra tests," or "PET") allows state machine 80 to transition to a state DIGIT corresponding to DD in FIG. 8A. This transition is indicated by the output DTMF_START. Successive D frames cause state machine 80 to cycle within the DIGIT state. An N frame detected in the DIGIT state causes a transition to state N_1b, and another N frame causes a transition from N_1b to N_2. All of DIGIT, N_1b, and N_2 are "in-digit" states, from which state machine 80 returns to DIGIT when the next frame is determined to be a D frame. State machine always outputs IN-DIGIT from any of the in-digit frames except for N_2.

N_2 is an in-digit state but is also the only exit from the in-digit side to the NDTMF (i.e. non-DTMF digit) side. Thus, if state machine 80 is in state N_2 and the next frame is determined to be N, then state machine 80 transitions to IDLE and outputs DTMF_END. As with all the states except N_1a and D_2, transition from N_2 does not entail an extra-tests determination (i.e., the value of COUNTER is not tested).

In the presently preferred embodiment, high-level decision logic 70 requires at least three successive DTMF frames in order to detect a DTMF digit. This requirement increases the robustness against talk-offs but also limits the minimal length of a detectable DTMF digit. In order to detect DTMF digits that last only 40 milliseconds (ms), detector 1 uses an overlap between the samples of successive frames. In one implementation, an overlap of 20 samples was used.

It is also apparent from the foregoing that the number of states provided by state machine 80 is not an essential feature of the invention. For example, state machine 80 could be configured for a digit-detection transition (i.e., transition from out-of-digit to in-digit) to depend on the current frame and three or four preceding frames, instead of two. For the case of three preceding frames, this would increase the number of basic states from four to eight.

The extra-tests determination can also take various forms in addition to or instead of testing a value COUNTER as described above. As noted above, the present invention accumulates indications from frequency estimation module 50. Those indications are used by state machine 80 for a quantitative assessment of whether a condition "close" to a DTMF digit is in fact the start of a digit. In the preferred embodiment, the extra-tests determination is performed only when state machine 80 is in a state from which a transition from out-of-digit to in-digit can be made.

Detector Training for Environment-Optimized Performance

An important advantage of the present invention is that the detector's performance (detection specifications) can be easily adapted to particular needs by training the detector with an appropriate signals database. A proper selection of the signals in the signals database will improve the accuracy of the frame decisions by reducing the minimized frequency of incorrect frame decision results. In the presently preferred embodiment, some signals were recorded during site surveys to reflect real-world conditions at customer installations. Other signals were synthesized signals that contained signals with impairments relating to customer-specified performance requirements. It has been found that a mix of many different types of sampled signals tends to produce the best results.

It has been found that the detection results might possibly undergo slight variations with a change in the signals database. The detector is nevertheless quite stable over a wide range of sample sets. This stability provides an additional advantage, because a well-behaved response variations in the training signals means that the detector has an enhanced capacity for being adapted to a customer's particular network signaling environment.

In one aspect, therefore, the present invention provides a novel DTMF detector using multidimensional thresholding to achieve improved accuracy in frame decisions. This makes the detector adaptable to various signal conditions by appropriate adjustment of the multidimensional thresholds. The decision logic in most available DTMF detectors is based on a set of tests in which each feature extracted from an input signal (such as energies output from the Goertzel filters, twist, energy ratios, and so forth) is compared to a corresponding threshold level. Using the results of these individual tests, such detectors perform frame decisions to determine whether a DTMF signal has been received.

It has been discovered that such a set of individual tests leads to sub-optimal results as compared with the multidimensional thresholding approach of the present invention. The specification of individual threshold tests has the effect of dividing a multidimensional signal space into two regions: a DTMF region and a non-DTMF region. The present invention proceeds from the observation that this a priori division of the signal space will impair the usual procedures for optimizing detection results. Such impairment in optimization effectively constitutes an artificial constraint on the optimization process that prevents a true optimal solution from being reached. The result is reduced accuracy in the detector's frame decisions.

In contrast, one aspect of the present invention is to employ multidimensional thresholding in which multiple threshold values are optimized collectively instead of individually. In the context of the presently preferred embodiment, this collective optimization is performed through iterative training of a neural network.

The multidimensional thresholding approach enables the present invention to identify more accurately the true boundary between the two classification regions in the signal space (DTMF and non-DTMF). A detector constructed according to this aspect of the invention is therefore more flexible than previous detectors. The present detector has the particular advantage of being more readily adaptable to a variety of actual signal environments.

The actual performance of a detector optimized with multidimensional thresholding will depend on the values input to the frame decision, the structure of the system implementing the multiple thresholds, and the technique employed for setting the multiple thresholds. The neural network structure shown in FIG. 4 was found to provide the best optimized performance of neural network structures that were investigated. The input values described above (e_ratio_l, e_ratio_h, concent_l, and concent_h) were also found to provide the best performance of input combinations tested.

Figure 9:
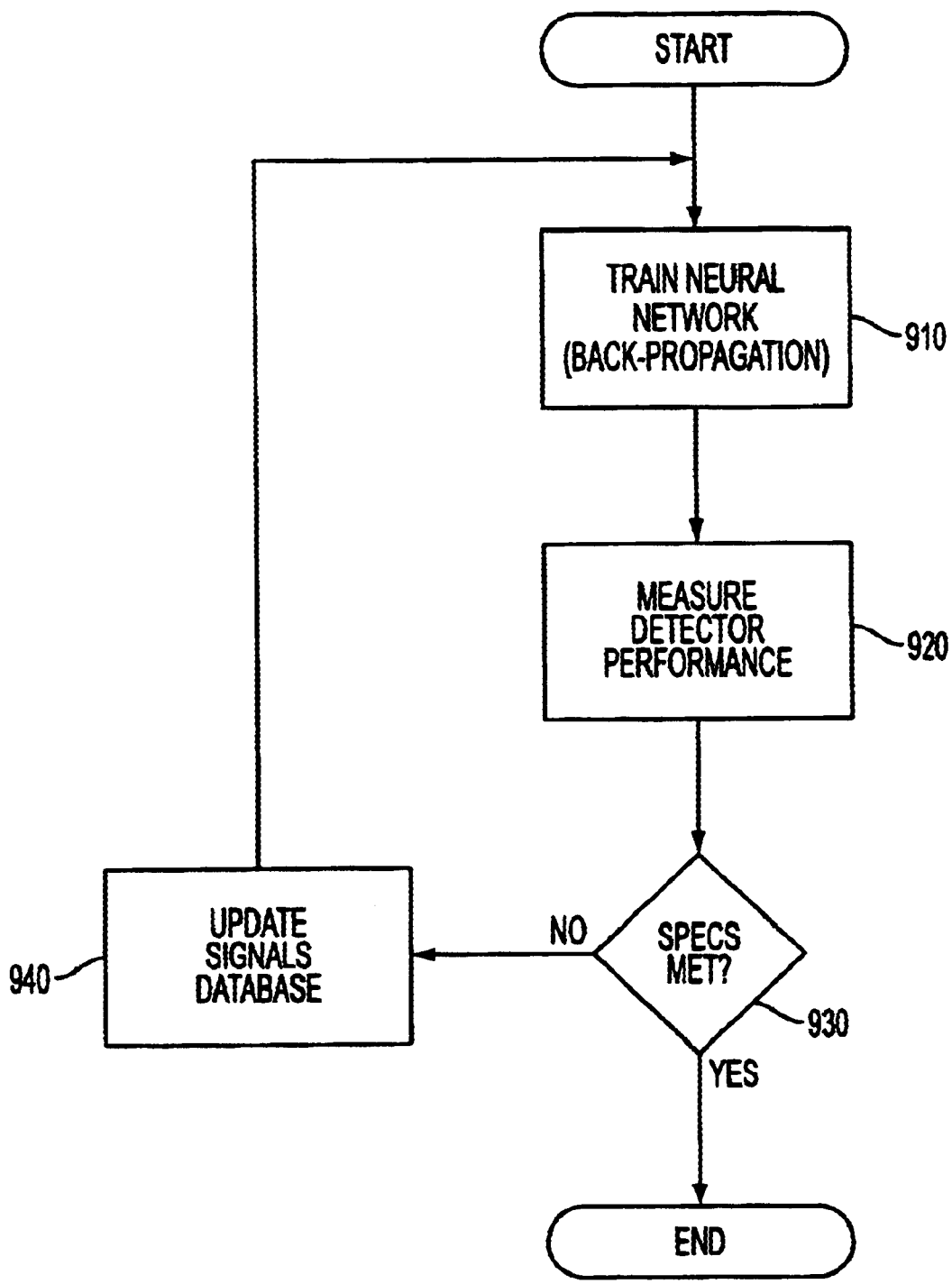
FIG. 9 is a flow diagram for an adaptive detector training procedure according to the invention.

FIG. 9 shows a flow diagram for a training procedure according to the present invention. The procedure begins at step 910 with back-propagation training of neural network 40 using heuristic signals database 100. In the presently preferred embodiment, a suitable version of signals database 100 is created for an application environment, such as a customer's particular network signaling environment. The initial version of database 100 typically will be assembled from a variety of recorded signals as well as synthesized signals representing DTMF digits with particular types of impairments.

Once detector 1 is trained to an optimal state according to the back-propagation technique, the detector's performance is measured at step 920 in a test environment (which may be a test run in an operational transmission network). The results of this performance test are then compared at step 930 with desired performance specifications for the application environment. An affirmative result of the comparison leads to termination of the training.

If the comparison at step 930 produces a negative result, then the procedure advances to step 940 where signals database 100 is updated. This updating operation may include supplementing database 100 with additional or modified signals selected according to the particular features of the failure results generated at step 930. That is, the performance deficiencies that caused detector 1 to fail the performance test can be used to select new signals for database 100, or to modify the existing signals therein, to improve the performance of detector 1 in the areas of deficiency.

After signals database 100 is updated, the procedure returns to training step 910 and neural network is retrained according to the back-propagation technique. The cycle of steps 910–940 can be repeated until detector 1 is optimized to satisfy the desired performance standards. With careful selection of the initial version and subsequent updates to database 100, the number of retraining iterations can be kept to a minimum.

The described multifrequency detector can be utilized with a variety of systems, such as telephony switching systems, interactive response systems, and tone-based control signaling systems.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A multifrequency detector, comprising:

a frequency estimation module calculating a plurality of estimated frequencies for an input signal and quality information corresponding to the estimated frequencies, the input signal being based on a frame of a signal;

a high-level decision module performing digit detection based on the quality information and a frame decision result for the frame; and a counter holding a value incremented when a first predetermined condition is satisfied and reset when a second predetermined condition is satisfied, determinations of whether the first and second predetermined conditions are satisfied being based on the quality information, wherein said high-level decision module performs digit detection based on whether the value of said counter satisfies a third predetermined condition.

2. A method for detecting multifrequency signals, comprising:

calculating a plurality of estimated frequencies for an input signal and quality information corresponding to the estimated frequencies, the input signal being based on a frame of a signal;

performing digit detection based on the quality information and a frame decision result for the frame; and incrementing a counter value when a first predetermined condition is satisfied and resetting the counter value when a second predetermined condition is satisfied, determinations of whether the first and second predetermined conditions are satisfied being based on the quality information, wherein the digit detection operation is performed based on whether the counter value satisfies a third determined condition.

3. A computer readable medium encoded with program instructions for detecting multifrequency signals, said program instructions comprising:

calculating a plurality of estimated frequencies for an input signal and quality information corresponding to the estimated frequencies, the input signal being based on a frame of a signal; and performing digit detection based on the quality information and a frame decision result for the frame, wherein:

said program instructions further comprise instructions for incrementing a counter value when a first predetermined condition is satisfied and resetting the counter value when a second predetermined condition is satisfied, determinations of whether the first and second predetermined conditions are satisfied being based on the quality information; and said instructions for digit detection include instructions for basing the digit detection on whether the counter value satisfies a third predetermined condition.

4. A multifrequency detector, comprising:

an energy analysis module generating a plurality of indices based on a plurality of spectral coefficients for a frame of a signal; and a decision unit generating a decision level based on a combination of at least two of the indices and outputting the decision level for comparison with a predetermined threshold value, wherein:

the combination of the indices is a linear combination; and said decision unit scales the indices by respective predetermined first weights, generates a plurality of first sums each including a linear combination of the scaled indices, and generates the decision level based on the plurality of first sums.

5. A method for detecting multifrequency signals, comprising:

generating a plurality of indices based on a plurality of spectral coefficients for a frame of a signal; and generating a decision level based on a combination of at least two of the indices and outputting the decision level for comparison with a predetermined threshold value, wherein:

the combination of the indices is a linear combination; and the decision level generating operation includes scaling the indices by respective predetermined first weights, generating a plurality of first sums each including a linear combination of the scaled indices, and generating the decision level based on the plurality of first sums.

6. A computer readable medium encoded with program instructions for detecting multifrequency signals, said program instructions comprising:

generating a plurality of indices based on a plurality of spectral coefficients for a frame of a signal; and generating a decision level based on a combination of at least two of the indices and outputting the decision level for comparison with a predetermined threshold value, wherein:

the combination of the indices is a linear combination; and said instructions for generating the decision level comprise instructions for scaling the indices by respective predetermined first weights, generating a plurality of first sums each including a linear combination of the scaled indices, and generating the decision level based on the plurality of first sums.

7. A multifrequency detector, comprising:

decision logic generating a plurality of indices from a plurality of spectral coefficients for an input signal representing a frame of a signal; and a neural network comprising an input layer generating plural first signals based on the indices, a hidden layer generating plural second signals based on the first signals, and an output layer generating a decision level based on the second signals, the decision level for comparison with a redetermined threshold value.

8. A multifrequency detector as recited in claim 7, wherein the hidden layer comprises a plurality of nodes each generating a first sum including a linear combination of the first signals and evaluating a predetermined first nonlinear transformation at the first sum to generate a corresponding one of the second signals.

9. A multifrequency detector as recited in claim 8, wherein all of the nodes evaluate a same first nonlinear transformation at the first sums.

10. A multifrequency detector as recited in claim 7, wherein the output layer generates a second sum including a linear combination of the second signals and evaluates a predetermined second nonlinear transformation at the second sum to generate the decision level.

11. A multifrequency detector as recited in claim 10, wherein the second nonlinear transformation is pre-selected from a ramp function, a step function, and a sigmoid function.

12. A multifrequency detector as recited in claim 10, wherein the second nonlinear transformation is a hyperbolic tangent function.

13. A multifrequency detector as recited in claim 8, wherein each node generates the corresponding second signal to have a non-zero value only when the value of the respective first nonlinear transformation evaluated at the respective first sum exceeds a predetermined value.

14. A multifrequency detector as recited in claim 10, wherein the second nonlinear transformation and all of the first nonlinear transformations are a same nonlinear transformation.

15. A method for detecting multifrequency signals, comprising:

generating a plurality of indices from a plurality of spectral coefficients for an input signal representing a frame of a signal; and processing the plurality of indices using a neural network comprising an input layer generating plural first signals based on the indices, a hidden layer generating plural second signals based on the first signals, and an output layer generating a decision level based on the second signals, the decision level for comparison with a predetermined threshold value.

16. A method as recited in claim 15, wherein:

the hidden layer of the neural network comprises a plurality of nodes; and the operation of processing the plurality of indices comprises using each of the nodes of the hidden layer for generating a first sum including a linear combination of the first signals and evaluating a predetermined first nonlinear transformation at the first sum to generate a corresponding one of the second signals.

17. A method as recited in claim 16, wherein the operation of processing the plurality of indices comprises evaluating a same first nonlinear transformation at all of the first sums.

18. A method as recited in claim 15, wherein the operation of processing the plurality of indices comprises using the output layer of the neural network to generate a second sum including a linear combination of the second signals and to evaluate a predetermined second nonlinear transformation at the second sum to generate the decision level.

19. A method as recited in claim 18, wherein the second nonlinear transformation is pre-selected from a ramp function, a step function, and a sigmoid function.

20. A method as recited in claim 18, wherein the second nonlinear transformation is a hyperbolic tangent function.

21. A method as recited in claim 16, wherein the operation of processing the plurality of indices comprises generating each of the second signals to have a non-zero value only when the value of the respective first nonlinear transformation evaluated at the respective first sum exceeds a predetermined value.

22. A method as recited in claim 18, wherein the second nonlinear transformation and all of the first nonlinear transformations are a same nonlinear transformation.

23. A computer readable medium encoded with program instructions for detecting multifrequency signals, said program instructions comprising instructions for:

generating a plurality of indices from a plurality of spectral coefficients for an input signal representing a frame of a signal; and processing the plurality of indices using a neural network comprising an input layer generating plural first signals based on the indices, a hidden layer generating plural second signals based on the first signals, and an output layer generating a decision level based on the second signals, the decision level for comparison with a predetermined threshold value.

24. A computer readable medium as recited in claim 23, wherein:
the hidden layer of the neural network comprises a plurality of nodes; and
said instructions for processing the plurality of indices comprise instructions for using each of the nodes of the hidden layer for generating a first sum including a linear combination of the first signals and evaluating a predetermined first nonlinear transformation at the first sum to generate a corresponding one of the second signals.

25. A computer readable medium as recited in claim 24, wherein said instructions for processing the plurality of indices comprise instructions for evaluating a same first nonlinear transformation at all of the first sums.

26. A computer readable medium as recited in claim 23, wherein said instructions for processing the plurality of indices comprise instructions for using the output layer of the neural network to generate a second sum including a linear combination of the second signals and to evaluate a predetermined second nonlinear transformation at the second sum to generate the decision level.

27. A computer readable medium as recited in claim 26, wherein the second nonlinear transformation is pre-selected from a ramp function, a step function, and a sigmoid function.

28. A computer readable medium as recited in claim 26, wherein the second nonlinear transformation is a hyperbolic tangent function.

29. A computer readable medium as recited in claim 24, wherein said instructions for processing the plurality of indices comprise instructions for generating each of the second signals to have a non-zero value only when the value of the respective first nonlinear transformation evaluated at the respective first sum exceeds a predetermined value.

30. A computer readable medium as recited in claim 26, wherein the second nonlinear transformation and all of the first nonlinear transformations are a same nonlinear transformation.

31. A method for training an adaptive multifrequency detector comprising a neural network, the method comprising:
training the neural network using back-propagation with input vectors from a heuristic signals database; and
training the neural network using back-propagation with input vectors from an updated signals database generated from the heuristic signals database in accordance with a performance measurement for the neural network trained using the heuristic signals database.

32. A method as recited in claim 31, wherein the heuristic signals database includes recorded multifrequency signals, synthesized multifrequency signals, and non-multifrequency signals.

33. A method as recited in claim 31, wherein:
the multifrequency detector is a DTMF detector; and
the heuristic signals database includes recorded DTMF signals, synthesized DTMF signals, and non-DTMF signals.

34. A method as recited in claim 31, wherein:
the neural network includes plural nodes arranged in an input layer, a hidden layer, and an output layer and applying a plurality of weights to respective inputs thereto; and
training the neural network includes adjusting one or more of the weights based on a decision level generated by the neural network from an input vector.

35. A method as recited in claim 32, wherein the non-multifrequency signals include recorded non-multifrequency signals and synthesized non-multifrequency signals.

36. A method as recited in claim 33, wherein the non-DTMF signals include recorded non-DTMF signals and synthesized non-DTMF signals.

* * * * *

UNITED STATES PATENT AND TRADEMARK OFFICE
CERTIFICATE OF CORRECTION

PATENT NO. : 6,674,855 B1
DATED : January 6, 2004
INVENTOR(S) : Yair Karelic et al.

It is certified that error appears in the above-identified patent and that said Letters Patent is hereby corrected as shown below:

Title page,
Item [56], References Cited, OTHER PUBLICATIONS, change "Amey A. Deosthali et al., A Low-Complexity ITU-Complaint Tone Multiple Frequency Detector, IEEE Trans. on Signal Processing, vol. 48, No. 3, Mar. 2000." to -- Amey A. Deosthali et al., A Low-Complexity ITU-Compliant Dual Tone Multiple Frequency Detector, IEEE Trans. on Signal Processing, vol. 48, No. 3, Mar. 2000. --.

Column 22,
Line 38, change "determined" to -- predetermined --;
Line 49, delete ";" after "wherein";
Line 56, after "information" delete ";" and insert -- , --;
Line 67, delete ":" after "wherein".

Column 23,
Lines 1, 16 and 32, delete ";" after "combination" (second occurrence) and insert -- , --;
Lines 15 and 31, delete ";" after "wherein";
Line 49, change "redetermined" to -- predetermined --.

Column 24,
Line 25, delete ":" after "wherein";
Line 27, delete ";" after "nodes" and insert -- , --.

Column 25,
Line 5, delete ";" after "wherein";
Line 7, delete ";" after "nodes" and insert -- , --.

UNITED STATES PATENT AND TRADEMARK OFFICE
CERTIFICATE OF CORRECTION

PATENT NO.    : 6,674,855 B1
DATED         : January 6, 2004
INVENTOR(S)   : Yair Karelic et al.

It is certified that error appears in the above-identified patent and that said Letters Patent is hereby corrected as shown below:

<u>Column 26,</u>
Lines 16 and 23, delete ":" after "wherein";
Line 17, delete ";" after "detector" and insert -- , --;
Line 27, delete ";" after "thereto" and insert -- , --.

Signed and Sealed this

Fourth Day of May, 2004

JON W. DUDAS
*Acting Director of the United States Patent and Trademark Office*